United States Patent
Olszewski et al.

(10) Patent No.: US 8,605,569 B2
(45) Date of Patent: Dec. 10, 2013

(54) METHODS FOR SUPERFRAME/FRAME OVERHEAD REDUCTION WITHIN OFDMA-BASED COMMUNICATION SYSTEMS

(75) Inventors: Kim Olszewski, South Jordan, UT (US); Sean Cai, San Diego, CA (US)

(73) Assignee: ZTE (USA) Inc., San Diego, CA (US)

( * ) Notice: Subject to any disclaimer, the term of this patent is extended or adjusted under 35 U.S.C. 154(b) by 626 days.

(21) Appl. No.: 12/863,119

(22) PCT Filed: Jan. 15, 2009

(86) PCT No.: PCT/US2009/031165
§ 371 (c)(1),
(2), (4) Date: Jan. 24, 2011

(87) PCT Pub. No.: WO2009/091931
PCT Pub. Date: Jul. 23, 2009

(65) Prior Publication Data
US 2011/0116485 A1    May 19, 2011

Related U.S. Application Data

(60) Provisional application No. 61/021,284, filed on Jan. 15, 2008.

(51) Int. Cl.
*H04J 11/00* (2006.01)
(52) U.S. Cl.
USPC ........................................................ 370/203
(58) Field of Classification Search
None
See application file for complete search history.

(56) References Cited

U.S. PATENT DOCUMENTS

| | | |
|---|---|---|
| 2006/0126553 A1 | 6/2006 | Lim et al. |
| 2007/0047432 A1 | 3/2007 | Cho et al. |
| 2007/0086474 A1 | 4/2007 | Lee et al. |
| 2007/0140167 A1 | 6/2007 | Jang et al. |
| 2008/0101213 A1* | 5/2008 | Mohanty et al. .............. 370/208 |

OTHER PUBLICATIONS

Bourlas et al., IEEE C802.16maint-07/053, "Considerations for UL MAP Overhead Reduction" Nov. 4, 2007.
International Search Report for PCT/US2009/031165, mailed on Jun. 18, 2009, 2 pages.
Written Opinion of the International Searching Authority for PCT/US2009/031165, mailed on Jun. 18, 2009, 3 pages.

* cited by examiner

*Primary Examiner* — Andrew Lai
*Assistant Examiner* — Leon Andrews
(74) *Attorney, Agent, or Firm* — Duane Morris LLP

(57) ABSTRACT

A method for tessellating a subframe using maximal-sized bricks. A brick bandwidth and a brick time duration are computed based on the heights and widths of the bursts in the subframe. Bursts within the brick-tessellated subframe are referenced using a brick-based coordinate system in which burst location and size are specified in units of bricks. A method for assembling and disassembling brick-based superframes is also disclosed. Bricked-based superframes are assembled and disassembled using a Superframe Preamble, a Superframe Control Header (SFCH), a Superframe Downlink Map (SDL-MAP), a Superframe Uplink MAP (SUL-MAP) and brick-structured downlink and uplink frames.

29 Claims, 26 Drawing Sheets

Contiguous Sequence of OFDMA Symbols $$B(p_0:p_{r-1},q_0:q_{c-1}) = \begin{bmatrix} x(p_0,q_0) & x(p_0,q_1) & x(p_0,q_2) & \cdots & x(p_0,q_{c-1}) \\ x(p_1,q_0) & x(p_1,q_1) & x(p_1,q_2) & \cdots & x(p_1,q_{c-1}) \\ \vdots & \vdots & \vdots & & \vdots \\ x(p_{r-1},q_0) & x(p_{r-1},q_1) & x(p_{r-1},q_2) & \cdots & x(p_{r-1},q_{c-1}) \end{bmatrix}$$ Contiguous Sequence of OFDMA Subcarriers 400 — Brick Structure

Brick Element Definition

$$x(p_a,q_b) = \frac{1}{\sqrt{N_{FFT}}} \sum_{n=0}^{N_{FFT}-1} s(n,q_b) e^{j2\pi p_a n / N_{FFT}}$$

$a = 0,1,...,r-1$
$b = 0,1,...,c-1$

Brick Element Frequency Indices

$p_0, p_1, ..., p_{r-1}$ is a contiguous sequence of $r$ subcarriers indices such that $0 \leq p_0 < p_1 < p_2 < ... < p_{r-1} \leq N_{FFT}-1$

Brick Element Time Indices

$q_0, q_1, ..., q_{c-1}$ is a contiguous sequence of $c$ OFDMA symbol indices such that $0 \leq q_0 < q_1 < q_2 < ... < p_{c-1}$

Brick Structure

400

$$B(p_0 \cdots p_{r-1}, q_0 : q_{C-1}) = \begin{bmatrix} x(p_0,q_0) & x(p_0,q_1) & x(p_0,q_2) & \cdots & x(p_0,q_{C-1}) \\ x(p_1,q_0) & x(p_1,q_1) & x(p_1,q_2) & \cdots & x(p_1,q_{C-1}) \\ \vdots & \vdots & \vdots & \ddots & \vdots \\ x(p_{r-1},q_0) & x(p_{r-1},q_1) & x(p_{r-1},q_2) & \cdots & x(p_{r-1},q_{C-1}) \end{bmatrix}$$

⎫ Contiguous Sequence of OFDMA Symbols

⎫ Contiguous Sequence of OFDMA Subcarriers

Brick Element Definition

$$x(p_a, q_b) = \frac{1}{\sqrt{N_{FFT}}} \sum_{n=0}^{N_{FFT}-1} s(n,q_b) e^{j2\pi p_a n / N_{FFT}}$$

$a = 0, 1, ..., r-1$
$b = 0, 1, ..., c-1$

Brick Element Frequency Indices

$p_0, p_1, ..., p_{r-1}$ is a contiguous sequence of r subcarriers indices such that $0 \leq p_0 < p_1 < p_2 < ... < p_{r-1} \leq N_{FFT}-1$

Brick Element Time Indices

$q_0, q_1, ..., q_{c-1}$ is a contiguous sequence of c OFDMA symbol indices such that $0 \leq q_0 < q_1 < q_2 < ... < p_{C-1}$

FIG. 4

Each burst may be addressed to one or more network users.
Example:
Bursts 0,4 and 5 addressed to User 1
Bursts 1,2,3 and 4 addressed to User 2

Table of Field Values

| Field Name | Burst Number k | | | | | |
|---|---|---|---|---|---|---|
| | 0 | 1 | 2 | 3 | 4 | 5 |
| Burst_Time_Offset[k] | (0,1) | (0,1) | (0,1) | (2,2) | (3,2) | (4,3) |
| Burst_Time_Duration[k] | (1,1) | (2,2) | (3,2) | (2,2) | (1,1) | (0,1) |
| Burst_Frequency_Offset[k] | (0,1) | (7,3) | (11,4) | (0,1) | (7,3) | (11,4) |
| Burst_Bandwidth[k] | (6,3) | (3,2) | (4,3) | (6,3) | (3,2) | (4,3) |
| Total # of bits | 6 | 8 | 10 | 8 | 8 | 11 |
| Total # of bits prior art | 27 | 27 | 27 | 27 | 27 | 27 |
| % Decrease in overhead bits | 78 | 70 | 63 | 70 | 70 | 59 |
| Overall decrease in overhead bits 69% | | | | | | |
| Each table pair contains the field's decimal value and # of bits required (decimal value,# of bits required). Brick dimensions are r=2, c=6 | | | | | | |

FIG. 6A
*(Continued)*

Each burst may be addressed to one or more network users

Table of Field Values

| Field Name | Burst Number k | | | | | | |
|---|---|---|---|---|---|---|---|
| | 0 | 1 | 2 | 3 | 4 | 5 | 6 |
| Burst_Time_Offset[k] | (0,1) | (0,1) | (1,1) | (1,1) | (2,2) | (3,2) | (3,2) |
| Burst_Time_Duration[k] | (0,1) | (0,1) | (1,1) | (0,1) | (0,1) | (0,1) | (0,1) |
| Burst_Frequency_Offset[k] | (0,1) | (1,1) | (0,1) | (1,1) | (1,1) | (0,1) | (1,1) |
| Burst_Bandwidth[k] | (0,1) | (0,1) | (0,1) | (0,1) | (0,1) | (0,1) | (0,1) |
| Total # of bits | 4 | 4 | 4 | 4 | 5 | 5 | 5 |
| Total # of bits prior art | 27 | 27 | 27 | 27 | 27 | 27 | 27 |
| % Decrease in overhead bits | 85 | 85 | 85 | 85 | 82 | 82 | 82 |
| Overall decrease in overhead bits 84% | | | | | | | |
| Each table pair contains the field's decimal value and # of bits required (decimal value, # of bits required). Brick dimensions are r=16, c=6 | | | | | | | |

FIG. 6B
*(Continued)*

Each burst may be addressed to one or more network users

Table of Field Values

| Field Name | Burst Number k | |
|---|---|---|
| | 0 | 1 |
| Burst_Time_Offset[k] | (0,1) | (1,1) |
| Burst_Time_Duration[k] | (0,1) | (0,1) |
| Burst_Frequency_Offset[k] | (0,1) | (0,1) |
| Burst_Bandwidth[k] | (0,1) | (0,1) |
| Total # of bits | 4 | 4 |
| Total # of bits prior art | 27 | 27 |
| % Decrease in overhead bits | 85 | 85 |
| Overall decrease in overhead bits 85% | | |
| Each table pair contains (decimal value, # of bits required) Brick dimensions are r=32, c=16 | | |

FIG. 6C
*(Continued)*

OFDMA Downlink (DL) Subframe

| Subcarrier | | | | |
|---|---|---|---|---|
| 0/1 | B(0:1,0:5) Burst 0 | B(0:1,6:11) Burst 16 | B(0:1,12:17) Burst 32 | B(0:1,18:23) Burst 48 |
| 2/3 | B(2:3,0:5) Burst 1 | B(2:3,6:11) Burst 17 | B(2:3,12:17) Burst 33 | B(2:3,18:23) Burst 49 |
| 4/5 | B(4:5,0:5) Burst 2 | B(4:5,6:11) Burst 18 | B(4:5,12:17) Burst 34 | B(4:5,18:23) Burst 50 |
| 6/7 | B(6:7,0:5) Burst 3 | B(6:7,6:11) Burst 19 | B(6:7,12:17) Burst 35 | B(6:7,18:23) Burst 51 |
| 8/9 | B(8:9,0:5) Burst 4 | B(8:9,6:11) Burst 20 | B(8:9,12:17) Burst 36 | B(8:9,18:23) Burst 52 |
| 10/11 | B(10:11,0:5) Burst 5 | B(10:11,6:11) Burst 21 | B(10:11,12:17) Burst 37 | B(10:11,18:23) Burst 53 |
| 12/13 | B(12:13,0:5) Burst 6 | B(12:13,6:11) Burst 22 | B(12:13,12:17) Burst 38 | B(12:13,18:23) Burst 54 |
| 14/15 | B(14:15,0:5) Burst 7 | B(14:15,6:11) Burst 23 | B(14:15,12:17) Burst 39 | B(14:15,18:23) Burst 55 |
| 16/17 | B(16:17,0:5) Burst 8 | B(16:17,6:11) Burst 24 | B(16:17,12:17) Burst 40 | B(16:17,18:23) Burst 56 |
| 18/19 | B(18:19,0:5) Burst 9 | B(18:19,6:11) Burst 25 | B(18:19,12:17) Burst 41 | B(18:19,18:23) Burst 57 |
| 20/21 | B(20:21,0:5) Burst 10 | B(20:21,6:11) Burst 26 | B(20:21,12:17) Burst 42 | B(20:21,18:23) Burst 58 |
| 22/23 | B(22:23,0:5) Burst 11 | B(22:23,6:11) Burst 27 | B(22:23,12:17) Burst 43 | B(22:23,18:23) Burst 59 |
| 24/25 | B(24:25,0:5) Burst 12 | B(24:25,6:11) Burst 28 | B(24:25,12:17) Burst 44 | B(24:25,18:23) Burst 60 |
| 26/27 | B(26:27,0:5) Burst 13 | B(26:27,6:11) Burst 29 | B(26:27,12:17) Burst 45 | B(26:27,18:23) Burst 61 |
| 28/29 | B(28:29,0:5) Burst 14 | B(28:29,6:11) Burst 30 | B(28:29,12:17) Burst 46 | B(28:29,18:23) Burst 62 |
| 30/31 | B(30:31,0:5) Burst 15 | B(30:31,6:11) Burst 31 | B(30:31,12:17) Burst 47 | B(30:31,18:23) Burst 63 |

OFDMA Subcarrier Number (vertical axis)

OFDMA Symbol Number: 0 1 2 3 4 5 6 7 8 9 10 11 12 13 14 15 16 17 18 19 20 21 22 23

FIG. 6D

Each burst may be addressed to one or more network users

Table of Field Values

| Field Name | Total Number of Bits for all k |
|---|---|
| Burst_Time_Offset[k] | 96 |
| Burst_Time_Duration[k] | 64 |
| Burst_Frequency_Offset[k] | 50 |
| Burst_Bandwidth[k] | 64 |
| Total # of bits | 274 |
| Total # of bits prior art | 1728 |
| Overall decrease in overhead bits | 84% |
| Brick dimensions are r=2, c=6 ||

FIG. 6D
(Continued)

Address Equation for the Fields Defining the kth Burst

$$Address\_CID[k] = \sum_{i=0}^{6} N_{F_i} + k\left(2\sum_{i=0}^{1} m_{F_i} + \sum_{i=7}^{8} N_{F_i}\right) \quad \text{(Equation \#1)}$$

$$Address\_DIUC[k] = Address\_CID[k] + N_{F_7} \quad \text{(Equation \#2)}$$

$$Address\_Burst\_Time\_Offset[k] = Address\_DIUC[k] + N_{F_8} \quad \text{(Equation \#3)}$$

$$Address\_Burst\_Time\_Duration[k] = Address\_Burst\_Time\_Offset[k] + m_{F_0} \quad \text{(Equation \#4)}$$

$$Address\_Burst\_Frequency\_Offset[k] = Address\_Burst\_Time\_Duration[k] + m_{F_0} \quad \text{(Equation \#5)}$$

$$Address\_Burst\_Bandwidth[k] = Address\_Burst\_Frequency\_Offset[k] + m_{F_1} \quad \text{(Equation \#6)}$$

Size and Location Equation for the kth Burst

$$OFDMA\_Symbol\_Offset[k] = Burst\_Time\_Offset[k] * c \quad \text{(Equation \#7)}$$

$$Number\_of\_Symbols[k] = Burst\_Time\_Duration[k] * c \quad \text{(Equation \#8)}$$

$$OFDMA\_Subchannel\_Offset[k] = Burst\_Frequency\_Offset[k] * r \quad \text{(Equation \#9)}$$

$$Number\_of\_Subchannels[k] = Burst\_Bandwidth[k] * r \quad \text{(Equation \#10)}$$

*FIG. 7C*

METHODS FOR SUPERFRAME/FRAME OVERHEAD REDUCTION WITHIN OFDMA-BASED COMMUNICATION SYSTEMS

RELATED PATENT APPLICATIONS

This application is a U.S. National phase of International Patent Application No.

PCT/US2009/031165 filed Jan. 15, 2009, which claims benefit of priority under 35 U.S.C.§119(e) to Provisional Application No. 61/021,284, entitled "Methods for Superframe/Frame Overhead Reduction Within OFDMA-Based Communication Systems", filed Jan. 15, 2008;the contents of these applications are incorporated by reference herein in their entirety.

FIELD OF THE INVENTION

This invention relates to wireless communication networks, systems and techniques that employ Orthogonal Frequency Division Multiple Access (OFDMA) for the air interface. This invention discloses methods for reducing the number of overhead bits within OFDMA superframe and frame structures.

BACKGROUND OF THE INVENTION

OFDMA is a multi-user version of OFDM in which network users are allocated subsets of orthogonal subchannels. Each orthogonal subchannel has an equal bandwidth and is centered on the unique frequency of a subcarrier signal. The frequencies of the subcarrier signals are equally and minimally spaced so data modulation of the subcarrier signals facilitates optimal bandwidth efficiency. A subchannel subset may include all available subchannels or a group of adjacent or non-adjacent subchannels. Subchannel allocation to network users is typically the task of a scheduler. The scheduler may allocate subchannels to users based on criteria such as subchannel quality and users required quality of service.

FIG. 1A illustrates an exemplary frame structure for an IEEE 802.16 OFDMA-based system that operates in a Time Division Duplexing (TDD) mode. Referring to FIG. 1A it is seen that the OFDMA frame consists of a downlink (DL) and an uplink (UL) subframe with the DL subframe 101 always preceding the UL subframe 102. The DL and UL subframes are separated by a Transmit Transition Gap (TTG) 103 and a Receive Transition Gap (RTG) 104. These two gaps prevent DL and UL transmission collisions. Basic frame elements from which dynamic and complex IEEE 802.16 OFDMA frame structures are built are described in the remaining paragraphs of this section.

OFDMA Symbol. An OFDMA symbol is the smallest frame allocation unit in the time domain. In FIG. 1A there are L downlink OFDMA symbols and M uplink OFDMA symbols.

Logical Subchannels. FIG. 1A also shows S logical subchannels for the exemplary IEEE 802.16 DL and UL subframes. Logical subchannels are the smallest logical unit within the frequency domain. A logical subchannel is comprised of a set of physical subchannels that may be adjacent or non-adjacent. The set of subcarriers used for a logical subchannel may change from one OFDMA symbol to another. In a DL subframe, a logical subchannel may be intended for one or more receivers; in an UL subframe, a transmitter may be assigned one or more logical subchannels, and several transmitters may transmit their UL logical subchannels simultaneously.

Logical Subchannel Group. A logical subchannel group is comprised of one or more logical subchannels. FIG. 1B shows 6 logical subchannel groups for an exemplary IEEE 802.16 DL subframe.

Segment. A segment is a set of logical subchannel groups; it is a subdivision of the set of available OFDMA logical subchannels that may include all available logical subchannels. FIG. 1B shows three segments within a DL subframe. Segments are typically associated with the three sectors of a base station cell.

Zones. An IEEE 802.16 OFDMA frame is typically comprised of one or more zones (see FIG. 1C). A zone is one complete logical time-frequency part or partition of an OFDMA subframe. There are a number of types of zones. The most used zone types are called Fully Used Subchannel (FUSC) zones and Partially Used Subchannel (PUSC) zones. FUSC zones use all OFDMA logical subchannels; PUSC zones use a subset of available logical subchannels. A PUSC zone must occur as the first DL zone in every DL subframe. FIG. 1C shows an exemplary PUSC zone 121 within a DL subframe. In addition to FUSC and PUSC zones there are other types of DL and UL zones such as PUSC with the complete set of logical subchannels, optional FUSC, AMC (Adaptive Modulation and Coding), AAS (Adaptive Antenna System), TUSC1 (Tile Usage of Sub-Channel 1) and TUSC2 (Tile Usage of Sub-Channel 2). The maximum number of the various DL zones types within a subframe is 8. The transition between zones is indicated by information elements within frame control structures.

Bursts. A burst is a rectangular or square area within a subframe zone comprised of a specified number of logical subchannels and a specified number of OFDMA symbols. Burst are shown in FIGS. 1A, 1B, 2A and 2B. Bursts contain OFDMA user's FEC encoded and modulated MAC packet or protocol data units. OFDMA supports adaptive burst profiling meaning coding and modulation may be changed for each burst. For each user, the maximum number of bursts to decode in one DL subframe is 64. As shown in FIG. 2B, the location of a burst within a subframe is specified using four fixed-length parameters or fields: OFDMA symbol offset 210, logical subchannel offset 211, number of logical subchannels 212, and number of OFDMA symbols 213.

Slots. Each burst is comprised of a number of slots (see FIG. 2B). A slot is the minimum possible data allocation unit within a OFDMA frame structure, its size is defined in terms of time and frequency. A slot's size depends on zone type and is one logical subchannel by one, two, three, or six OFDMA symbols.

Preamble. A BPSK modulated preamble (see FIG. 2A) is broadcast to all network users and is typically used for DL synchronization (cell search, frame timing acquisition, frequency offset estimation, symbol timing estimation) and channel estimation. It is a reference signal known by all network receivers.

Frame Control Header. A Frame Control Header (FCH) follows the preamble field and for high reliability it is transmitted using QPSK modulation, rate ½ channel coding and four-fold repetition encoding (four logical subchannels with successive logical subchannel numbers). The FCH provides frame configuration information such as logical subchannel groups to be used on the first DL-PUSC zone and a DL Frame Prefix (DLFP). The DLFP provides information for the subsequent DL-MAP (Medium Access Protocol). The DLFP contains information such as subchannel groups used by the DL-MAP, subchannel repetition coding used in the DL-MAP, modulation and channel coding used in DL-MAP, and the length of the DL-MAP burst in units of slots.

DL-MAP and UL-MAP. Referring to FIG. 2A DL/UL MAPs are used to broadcast frame allocation information and other control information for subsequent DL and UL subframes. Allocations specified by the DL-MAP or UL-MAP do not span over multiple zones. DL/UL MAPs begin with header fields followed by a sequence of one or more information elements.

Information Elements. Referring to FIG. 2A DL/UL MAPs contain one information element (IE) for each burst allocated or scheduled for subsequent DL and UL subframes. In both DL/UL MAPs the very last IE is empty and indicates the end of a subframe (not shown in FIG. 2A). Each IE includes a DL or UL interval usage code (DNC or UIUC). An interval usage code specifies a unique burst profile that is to be used for a DL or UL burst. Burst profiles specify a burst's coding and modulation. Each IE also includes fields that define the size and location of its associated burst within a DL or UL subframe. A burst's size and location is represented using four IE fields. The four fields specify a burst's OFDMA symbol offset, the number of OFDMA symbols comprising the burst, its OFDMA subchannel offset, and the number of logical subchannels comprising the burst. The symbol offset field uses the preamble as a reference. Burst power level and repetition coding scheme may also be included within an IE.

Logical Ranging, CQI and ACK Subchannels. Referring to FIG. 2A an UL Ranging Subchannel is used to perform closed-loop time, frequency, and power adjustment as well as bandwidth requests. Four types of ranging are defined: (1) ranging for UL synchronization in time and frequency, (2) initial ranging for when a user enters the network, (3) periodic ranging after a connection is set up, (4) hand-over ranging, and (5) bandwidth request. The UL CQICH (channel quality indicator subchannel) is used by users to feedback channel-state information. The UL ACK Subchannel is used by users to feedback DL Hybrid-ARQ acknowledgements.

The above described OFDMA frame structure requires a significant amount of frame overhead to schedule or allocate bursts to a number of OFDMA users. The majority of the overhead is associated with the DL/UL MAPs. More specifically, within the DL/UL MAPs sequences of information elements are needed to define dynamic DL and UL bursts within subsequent DL and UL subframes. For each IE, the following four fields are required to specify the size and location of a burst within a subframe:

OFDMA_Symbol_Offset
Number_of_Symbols
OFDMA_Subchannel_Offset
Number_of_Subchannels Indeed, the lengths of these four fields should be minimal in order to reduce frame overhead. To better see the impact of these four fields on frame overhead refer to FIG. 2B where an example DL burst within a subframe's time-frequency plane is illustrated. The units on the time axis are OFDMA symbols. The units on the frequency axis are logical subchannels. It is easy to see from FIG. 2B that the total number of bits required to reference a single burst within the subframe is 27 bits (summation of the number of bits for all four fields). The maximum number of bursts to decode in one DL subframe is 64, hence, the maximum IE overhead required to specify the size and locations of these bursts is 64×27=1728 bits. If the number of OFDMA subcarriers is $N_{FFT}$=1024 and each OFDMA subchannel carries two bits (assuming QPSK modulation) the four IE fields for burst size and location would require 864 subcarriers for their transmission. This will leave only 160 OFDMA subcarriers to use for the FCH and UL-MAP, note that UL capacity will be significantly impacted. Another OFDMA symbol may be needed for the UL-MAP which would decrease the throughput data rate. In addition, subchannels will be needed for guard-bands, DIUC, and other DL fields that may carry information such as base station identifier, MIMO parameters, multi-hop relaying information, power levels, etc. Repetition coding of the subframe header fields over two or more subchannels will further decrease the number of bits available.

SUMMARY OF THE INVENTION

Embodiments of the invention provide a logical frame element called a brick. A brick is an area of contiguous OFDMA symbols and subcarriers (or physical subchannels) within a subframe that is treated as a single logical unit. In one embodiment, a brick covers a rectangular or square area within a subframe's time-frequency plane and may be varied in its dimensions to adapt to dynamic burst sizes and locations within a subframe. Burst sizes and locations within a subframe are dependent on time-varying channel, interference and network conditions.

A tessellation of a two-dimensional plane is a collection of plane structures that fills the plane with no overlaps and no gaps. Embodiments of the invention provide methods for tessellating OFDMA subframes using maximal-sized bricks. OFDMA bursts within a brick-tessellated subframe can be referenced using a brick-based coordinate system in which burst location and size are specified in units of bricks rather than units of logical subchannels and OFDMA symbols. The brick-based coordinate system allows the lengths of superframe/frame overhead fields to be reduced and to vary based on burst sizes. The reduction in overhead bits can be significant and is dependent on brick dimensions, the larger the brick dimensions the greater the reduction.

According to an embodiment of the invention, a method for assembling and disassembling brick-based superframes is also disclosed. Bricked-based superframes are assembled using a Superframe Preamble, a Superframe Control Header (SFCH), a Superframe Downlink Map (SDL-MAP), a Superframe Uplink MAP (SUL-MAP) and brick-structured downlink and uplink frames. The disclosed brick-based superframe structure subsumes the frame structures that are used in current IEEE 802.16 systems and can be easily modified or extended for other OFDMA-based systems. Brick-based Information Elements within the SDL-MAP and the SUL-MAP provide the necessary overhead fields.

BRIEF DESCRIPTION OF THE DRAWINGS

FIG. 4 illustrates the definition of a brick structure.

FIG. 6D illustrates an exemplary brick tessellation of OFDMA DL subframe.

FIG. 7C shows exemplary equations for addressing SDL-MAP fields and DL subframe bursts.

DETAILED DESCRIPTION OF EXEMPLARY EMBODIMENTS

In the following descriptions of exemplary embodiments references are made to the accompanying drawings. It is to be understood that other embodiments may be utilized and structural changes may be made to the drawings without departing from the scope of the preferred embodiments.

Apparatus for OFDMA Burst Generation

Figure 3A:
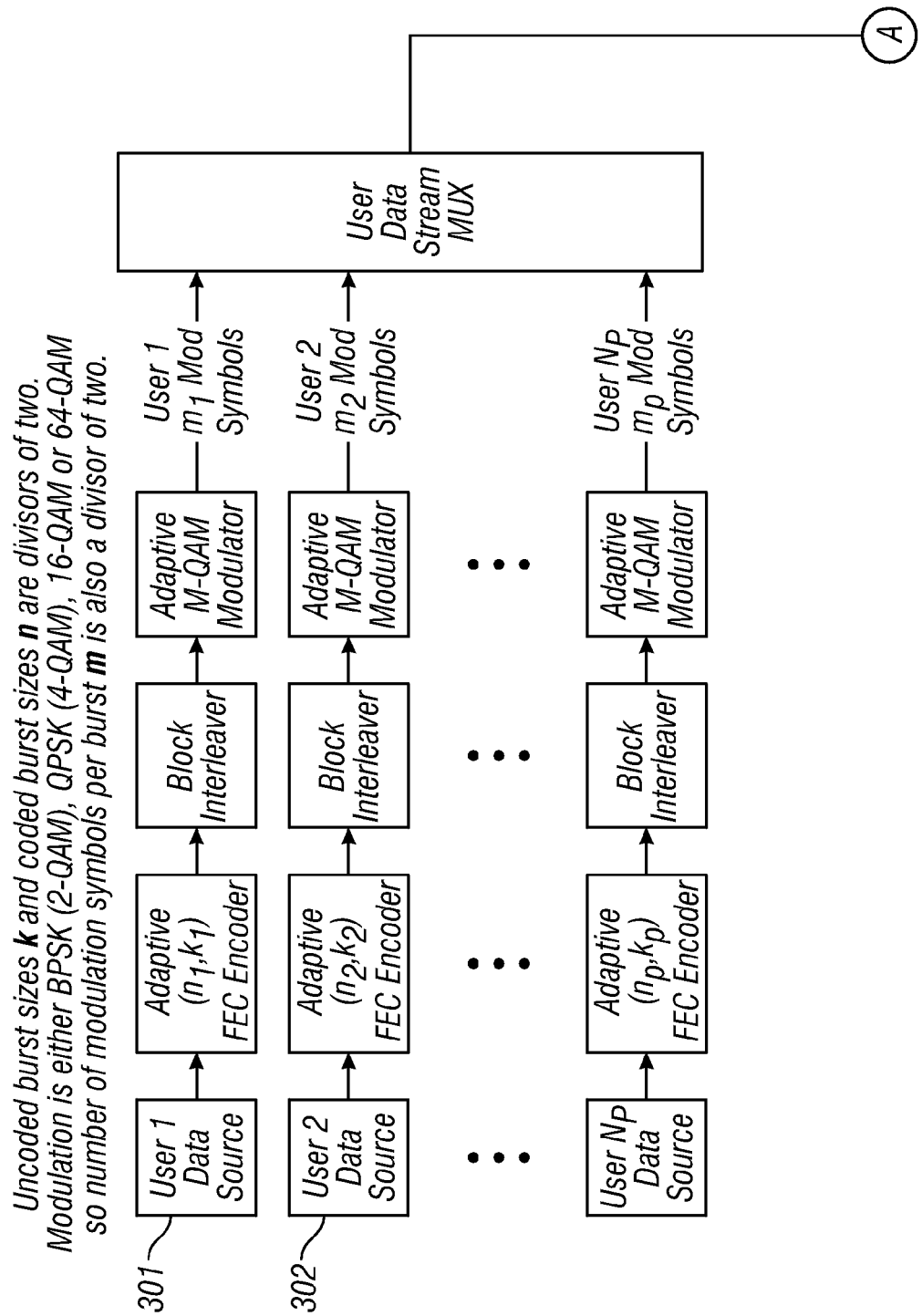
FIG. 3A illustrates an exemplary apparatus for mapping user data streams to data bursts (prior art).
Figure 3A:
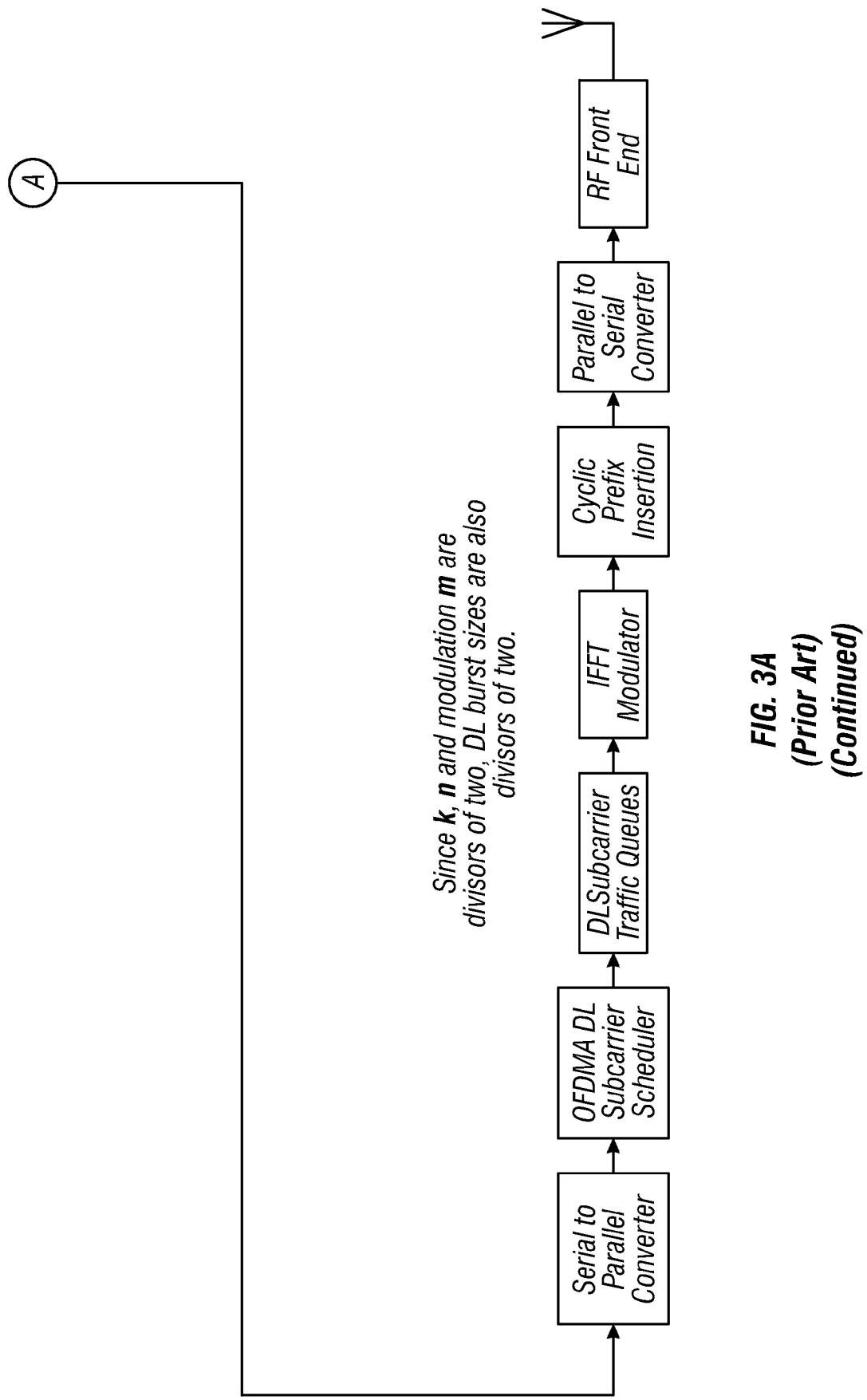

FIG. 3A shows an exemplary apparatus for mapping $N_p$ user data streams to data bursts that comprise OFDMA DL subframes. The apparatus shows simplified signal processing operations. The parallel implementation within FIG. 3A is only used to simplify the description. In an actual implementation of the apparatus a single encoder and a single modulator may be time shared between the users.

In FIG. 3A adaptive forward error correction(FEC) coding and adaptive M-QAM modulation are used to assure variable degrees of service quality for the $N_p$ users. For example, the parameter M for the adaptive M-QAM modulator may be set to M=4 (QPSK), M=16 (16-QAM) or M=64 (64-QAM). The code and/or code rate of the FEC encoder may also be adapted. Some code options for the FEC encoder include Convolutional Codes, Duo-Binary Turbo-Codes (also called convolutional turbo codes) and Block Low Density Parity Check (LDPC) codes, and the like. Duo-Binary Turbo-Codes and Block-LDPC Codes provide excellent performance for medium to large data block sizes (≥200 bits). Block-LDPC Codes outperform Duo-Binary Turbo-Codes at large data block lengths and/or high code rates. The use of convolutional codes is best for data block lengths (<200 bits). To achieve the best possible performance an adaptive encoder could use Duo-Binary Turbo-Codes codes for short data blocks with low-to-medium code rates and Block LDPC codes for long data blocks with high code rates. Binary convolutional codes could be used only for very short data blocks (<200 bits).

In FIG. 3A the $N_p$ user data sources produce data blocks of various lengths $\kappa_k$, k=0, ..., $N_p$-1. These data blocks are then input to adaptive FEC encoders that are parametrized by pairs $(\eta_k, \kappa_k)$ where $\eta_k$ denotes the length of an encoded data block. After interleaving the encoded data blocks are then input to the adaptive M-QAM modulators. For each value of M, the M-QAM modulator collects or buffers $m_k = \log_2(M)$ bits from the interleaver and maps the resulting length- $m_k$ bit vector to a modulation symbol within the selected M-QAM signal constellation.

The length of a user's data burst is dependent on the triple $(\eta_k, \kappa_k, m_k)$, k=0, ..., $N_p$-1. For example, if $\kappa_k$=48, $\eta_k$=96, and $m_k$=4 the length of the resulting burst is defined as $\beta_k = \eta_k / m_k$ =24. In one embodiment of the invention data block lengths $\kappa_k$, encoded data block lengths $\eta_k$ and the number of bits per M-QAM modulation symbol $m_k$ shall be set so that the resulting burst length $\beta_k$ is a divisor of two. Table 1 shows an exemplary set of values for parameters $\kappa_k$, $\eta_k$ and $m_k$ and resulting burst lengths $\beta_k$.

TABLE 1

Example parameters $\kappa_k$, $\eta_k$, $m_k$ and $\beta_k$.

| Code Rate ($\kappa_k/\eta_k$) | Data Bits ($\kappa_k$) | Coded Bits ($\eta_k$) | M-QAM Bits ($m_k$) | Burst Length ($\beta_k$) |
|---|---|---|---|---|
| 1/2 | 320 | 640 | 2 | 320 |
| 2/3 | 640 | 960 | 4 | 240 |
| 3/4 | 960 | 1280 | 4 | 320 |
| 5/6 | 1280 | 1536 | 6 | 256 |

Figure 1A:
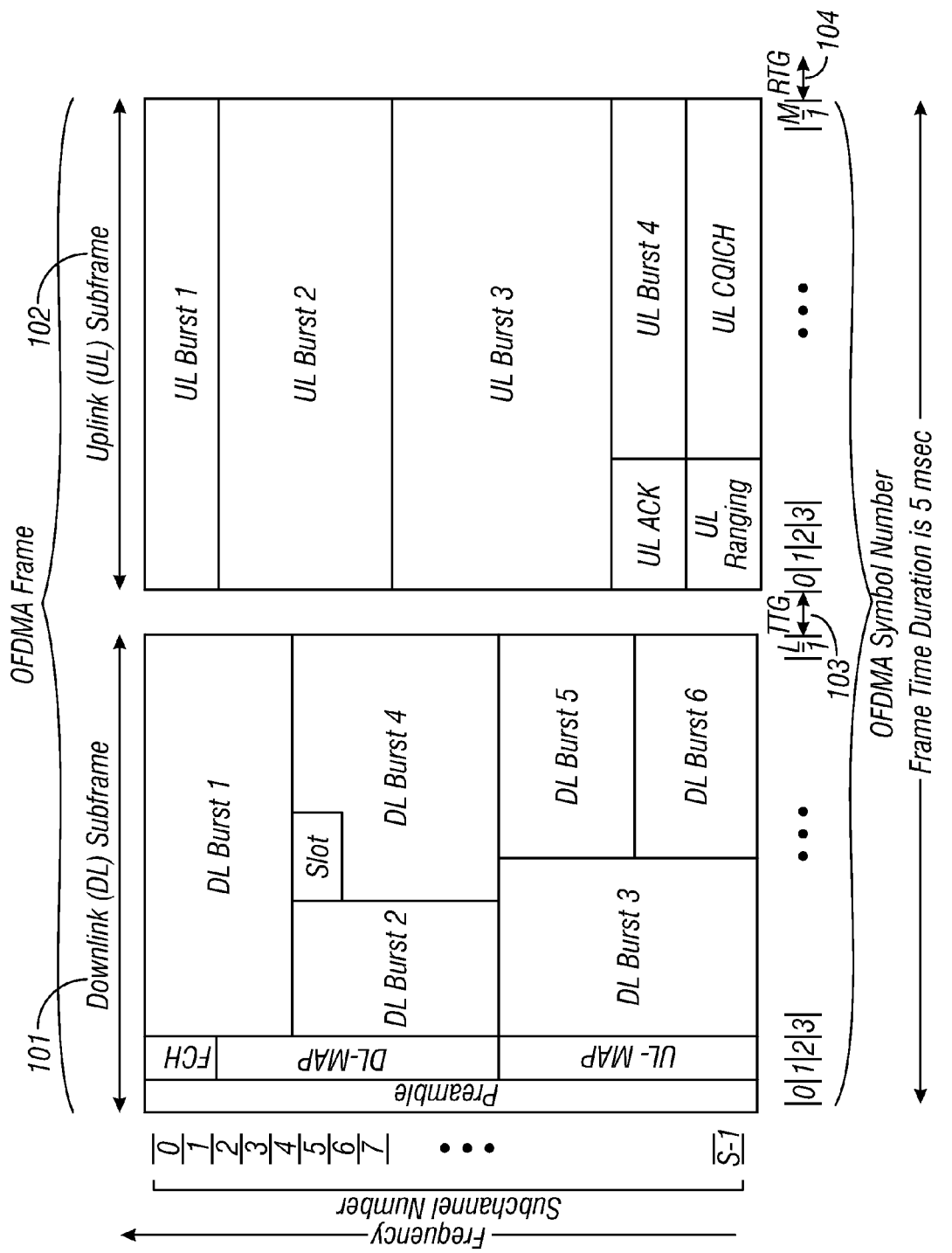
FIG. 1A illustrates an exemplary OFDMA frame (prior art).
Figure 1B:
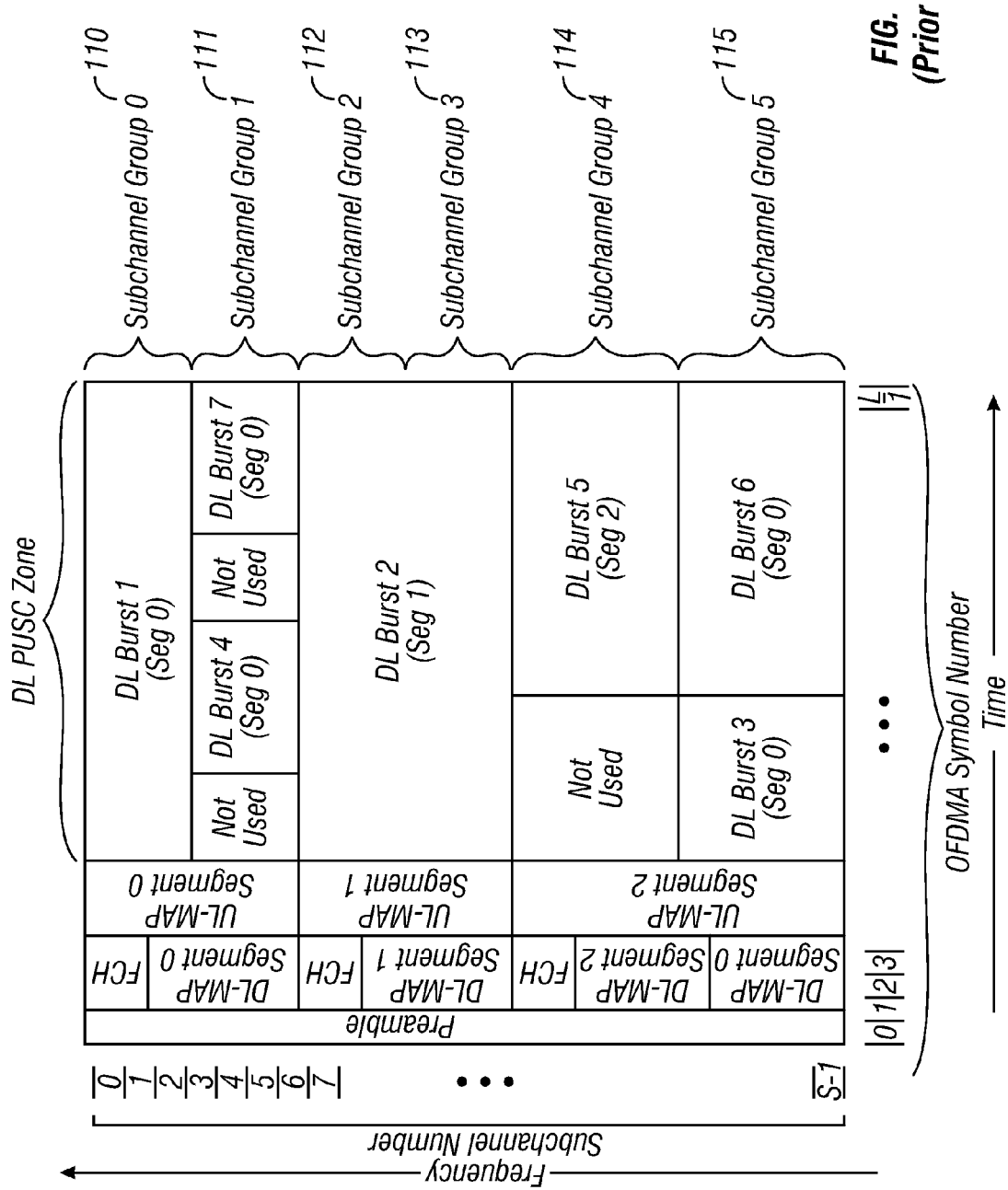
FIG. 1B illustrates an exemplary OFDMA DL subframe (prior art).
Figure 1C:
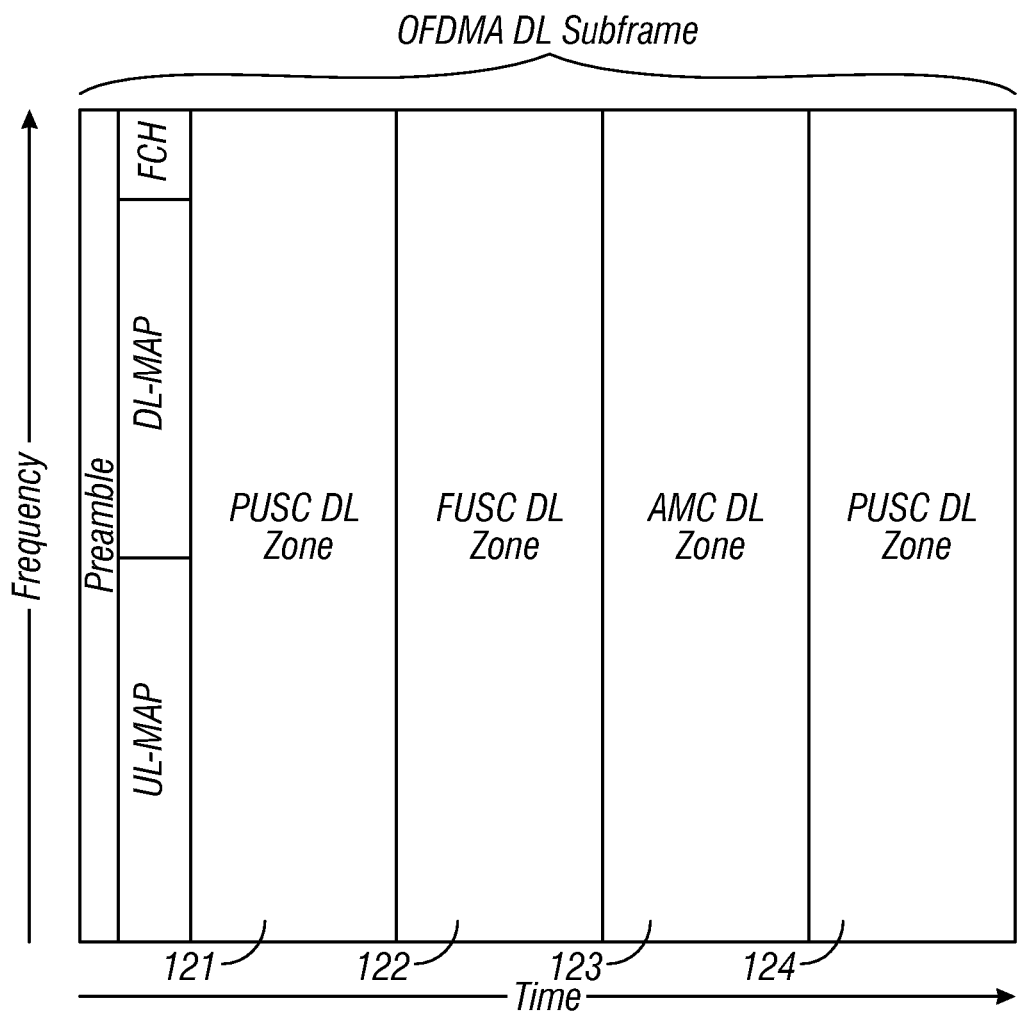
FIG. 1C illustrates an exemplary OFDMA DL subframe with zones (prior art).
Figure 2A:
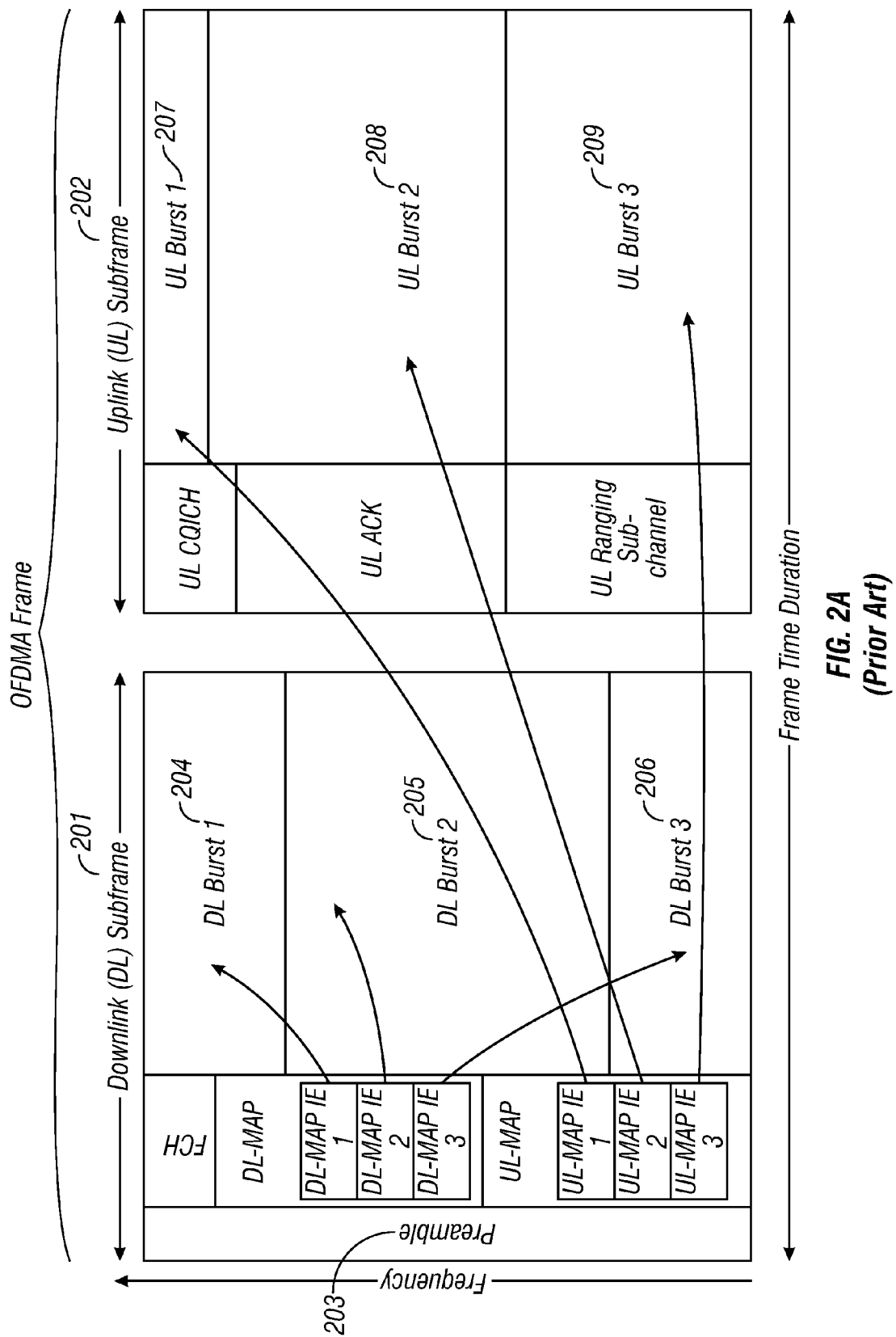
FIG. 2A illustrates an exemplary frame burst allocation using Information Elements within DL and UL MAPs (prior art).
Figure 2B:
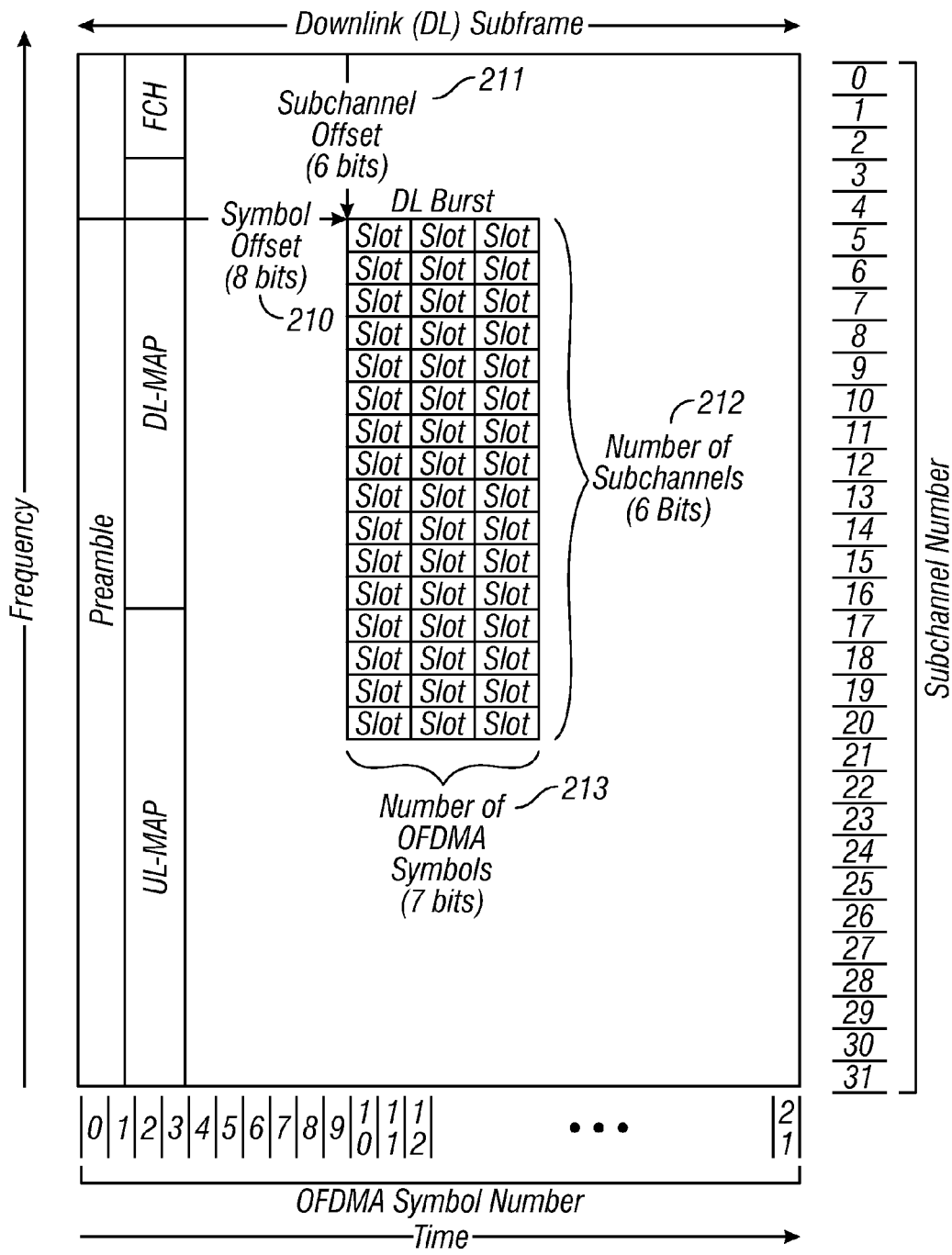
FIG. 2B illustrates four burst fields that are required to specify a burst's size and location within a subframe (prior art).

In one embodiment, a burst is a rectangular or square area within a subframe comprised of a specified number of logical subchannels/subcarriers (frequency slots) and a specified number of OFDMA symbols (time slots). Hence a set of $n_B$ subframe bursts may be parametrized by their heights ($\beta_{H,k}$, k=0, ..., $n_B$-1) and their widths ($\beta_{W,k}$, k=0, ..., $n_B$-1) where burst heights $\beta_{H,k}$ are in units of OFDMA logical subchannels or subcarriers and burst widths $\beta_{W,k}$ in units of OFDMA symbols (see FIG. 2B).

As shown in FIG. 3A bursts output from the serial-to-parallel converter are input to the DL OFDMA scheduler. The DL OFDMA scheduler maps each burst of length $\beta_k$ to a rectangular area within a subframe's time-frequency plane. The area of the k th burst $\beta_k$ is $\beta_{H,k} \times \beta_{W,k}$. The DL OFDMA scheduler can be viewed as an apparatus that reshapes each length-$\beta_k$ burst vector into a $\beta_{H,k}$-by-$\beta_{W,k}$ burst matrix within a subframe's time-frequency plane.

Figure 3B:
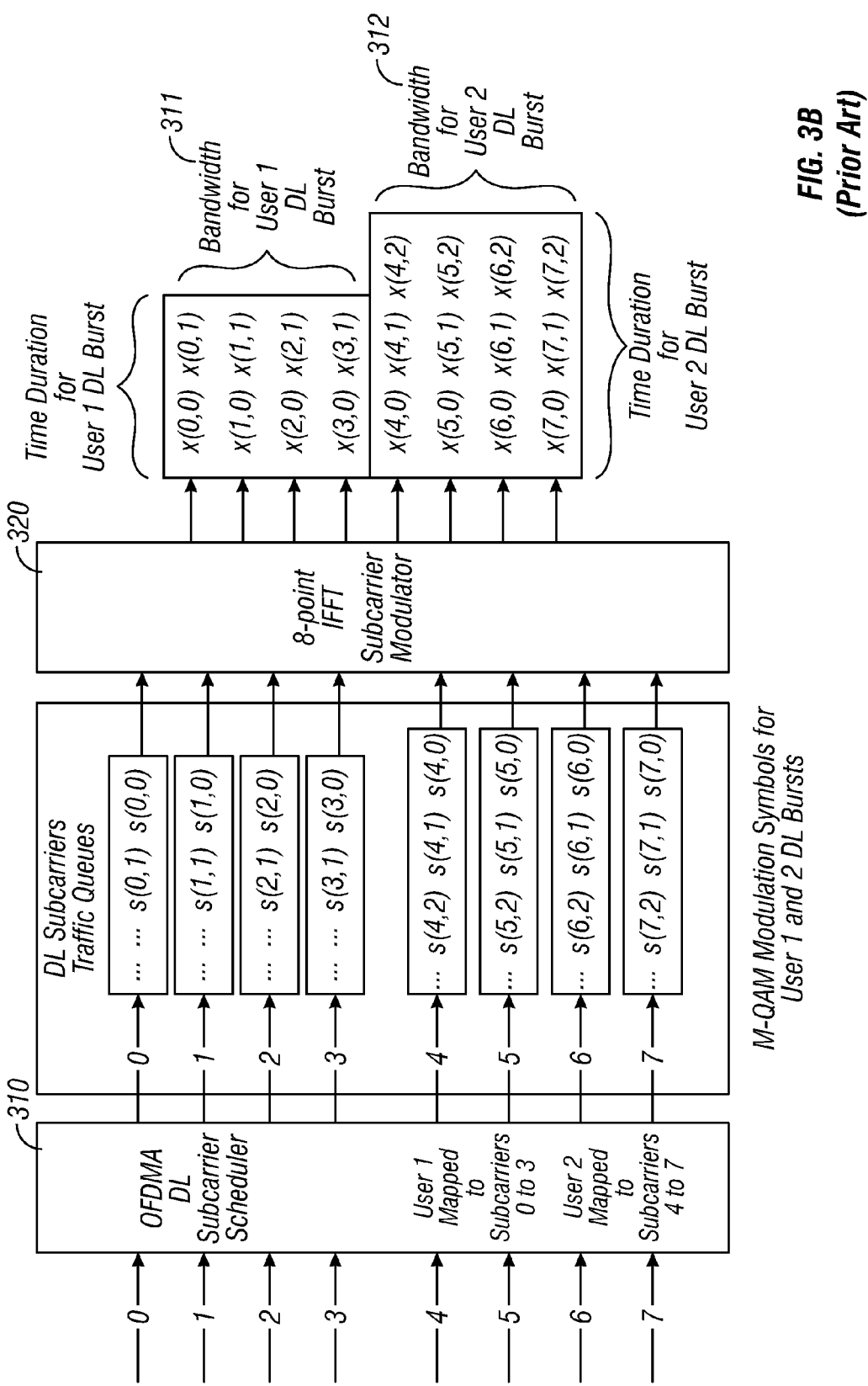
FIG. 3B illustrates an exemplary apparatus for mapping data bursts to a subframe (prior art).

FIG. 3B shows an exemplary apparatus for implementing the DL OFDMA scheduler, the DL Traffic Queues and the IFFT modulator ($N_{FFT}$=8). The scheduler routes its input data to the first-in, first-our traffic queues. In the example the scheduler routes User 1 symbols to the queues for OFDMA subcarriers 0 through 3; user 2 symbols are routed to the queues for OFDMA subcarriers 4 through 7. Note that each column in the traffic queues is associated with an OFDMA symbol. The IFFT block subcarrier modulates each column it receives as input.

FIG. 3B also shows two user bursts 311, 312 that comprise an area of a DL subframe. Each burst row is associated with an OFDMA subcarrier and each column an OFDMA symbol. The area of the bursts are $\beta_{H,1} \times \beta_{W,1}$=8 and $\beta_{H,2} \times \beta_{W,2}$=12 where $\beta_{H,1}$=4, $\beta_{W,1}$=2, $\beta_{H,2}$=4, and $\beta_{W,2}$=3. Burst elements are defined as $$x(p, q) = \frac{1}{\sqrt{N_{FFT}}} \sum_{n=0}^{N_{FFT}-1} s(n, q) e^{j2\pi pn/N_{FFT}} \quad (1)$$

$$p = 0, 1, \ldots, 7,$$

$$q = 0, 1, 2$$

where p denotes a discrete subcarrier frequency and q the transmit time of an OFDMA symbol or equivalently the OFDMA symbol number. The summation defines an inverse fast Fourier transform operation on a length $N_{FFT}=8$ vector of M-QAM modulation symbols $\{s(n,q)\}_{n=0}^{N_{FFT}-1}$. At the receive end, User 1 would have to wait for two OFDMA symbol time intervals before it can decode its data burst. At the receive end, User 2 would have to wait for three OFDMA symbol time intervals before it can decode its data burst.

Brick-Tessellated Subframes

Referring to FIG. 4 a brick $B(p_0: p_{r-1}, q_0: q_{c-1})$ 400 is defined as a adaptable size r-by-c matrix $$B(p_0: p_{r-1}, q_0: q_{c-1}) = \begin{bmatrix} x(p_0, q_0) & \ldots & x(p_0, q_{c-1})(3) \\ x(p_1, q_0) & \ldots & x(p_1, q_{c-1})(4) \\ \vdots & & :(5) \\ x(p_{r-1}, q_0) & \ldots & x(p_{r-1}, q_{c-1}) \end{bmatrix} \quad (2)$$

that is treated as a unique logical unit within a OFDMA subframe. Brick elements are defined as $$x(p_a, q_b) = \frac{1}{\sqrt{N_{FFT}}} \sum_{n=0}^{N_{FFT}-1} s(n, q_b) e^{j2\pi p_a n/N_{FFT}} \quad (3)$$

$a = 0, 1, \ldots, r-1$ $b = 0, 1, \ldots, c-1$ where $x(p_a, q_b)$ is produced via a length-$N_{FFT}$ IFFT operation on a modulation symbol sequence $\{s(n, q)\}_{n=0}^{N_{FFT}-1}$. Integers $p_a$ (a=0,1, ..., r−1) and $q_b$ (b=0,1, ..., c−1) denote subcarrier frequencies and OFDMA symbol numbers, they are contiguous and ordered as follows:

$0 \leq p_0 < p_1 < p_2 < \ldots < p_{r-1} \leq N_{FFT}-1$ (4)

$0 \leq q_0 < q_1 < q_2 < \ldots < q_{c-1}-1$ (5)

For example, the brick B(4:7, 3:4) is defined as $$B(4: 7, 3: 4) = \begin{bmatrix} x(4, 3) & x(4, 4) \\ x(5, 3) & x(5, 4) \\ x(6, 3) & x(6, 4) \\ x(7, 3) & x(7, 4) \end{bmatrix} \quad (6)$$

where $p_0=4$, $p_1=5$, $p_2=6$, $p_3=7$, $q_0=3$, and $q_1=4$.

A tessellation of a two-dimensional plane is defined as a collection of two-dimensional geometrical shapes that fills the plane with no overlaps and no gaps. According to one embodiment of the invention, a brick tessellation of a rectangular subframe is defined as a collection of two-dimensional bricks that fills a subframe with no overlaps or gaps between the bricks. It is a logical partitioning of a subframe using bricks that are associated with various OFDMA bursts. FIG. 6A, 6B, 6C and 6D show exemplary brick tesselations of OFDMA downlink subframes.

Given burst heights ($\beta_{H,k}$, k=0, ..., $n_B$ −1) and burst widths ($\beta_{W,k}$, k=0, ..., $n_B$ −1) in units of OFDMA subcarriers and OFDMA symbols, the maximal brick dimensions r and c for a subframe tessellation are computed using the equations $r = GCD(\beta_{H,0}, \beta_{H,1}, \ldots, \beta_{H,n_B-1})$ (7)

$c = GCD(\beta_{W,0}, \beta_{W,1}, \ldots, \beta_{W,n_B-1})$ (8)

where GCD denotes the greatest common divisor (GCD). Brick dimensions r and c are dependent on coding and modulation which adapt to time-varying channel, interference and network conditions. Hence, brick dimensions are also adaptive.

The GCD of two or more non-zero integers is the largest positive integer that divides these integers without remainder. For example, the GCD of burst heights $\beta_{H,0}=24$, $\beta_{H,1}=16$ and $\beta_{H,2}=12$ is 4. The GCD has numerous properties that can be used for its computation such as the property $GCD(\beta_{H,0}, \beta_{H,1}, \beta_{H,2}) = GCD(GCD(\beta_{H,0}, \beta_{H,1}), \beta_{H,2})$. This property can be extended to any number of bursts that comprise a subframe.

There are many efficient algorithms for computing the GCD. The Euclidean algorithm, extended Euclidean algorithm, and binary GCD algorithm are efficient for GCD computations. The following function shows a simple Euclidean algorithm for computing the GCD of two non-zero integers $x_1$ and $x_2$.

```
function GCD(x₁, x₂)
    while x₁ > 0 {
        temp = x₂
        x₂ = x₁ mod x₂
        x₁ = temp
    }
    return GCD = x₁
```

To maximize superframe/frame overhead reduction, GCD values that are equal to one must be avoided. As described above data block lengths $\kappa_k$, encoded data block lengths $\eta_k$, and bits per modulation symbol $m_k$ are divisors of two so burst lengths $\beta_k$ are constrained to be divisors of two. A scheduler maps each burst of length $\beta_k$ to a rectangular area within a subframe's time-frequency plane. The area of the k th burst is $\beta_k = \beta_{H,k} \times \beta_{W,k}$. Since burst lengths $\beta_k$ are constrained to be divisors of two, products $\beta_{H,k} \times \beta_{W,k}$ are also divisors of two. Hence, the mapping of bursts to subframes in this manner eliminates GCD values that are equal to one. For example, given a burst of length $\beta_k=240$ a scheduler may map this burst to a rectangular $\beta_{H,k} \times \beta_{W,k}=240$ area in the subframe's time-frequency plane. Some acceptable pairs for ($\beta_{H,k}$, $\beta_{W,k}$) are (12,20), (24,10), (6,40) and (30,8), others are also acceptable but not listed. The chosen pair to be used may be based on channel, interference and network conditions; it is a task of the scheduler to chose the optimal pair ($\beta_{H,k}, \beta_{W,k}$).

Given a pair of brick dimensions r and c, the number $n_R$ of r-by-c bricks that cover a subframe's bandwidth in the time-frequency plane can be computed from the equation $$n_R = \frac{N_{FFT}}{r} \quad (9)$$

where $N_{FFT}$ denotes the number of OFDMA subcarriers.

Similarly, the number $n_C$ of r-by-c bricks that cover a subframe's time duration in the time-frequency plane can be computed from the equation $$n_C = \frac{N_{Symbls}}{c} \quad (10)$$

where $N_{Symbls}$ denotes the number of OFDMA symbols within a subframe.

FIG. 6A, 6B, 6C and 6D show exemplary brick tessellations of OFDMA downlink subframes that were assembled using equations 7 and 8. For simplicity guard bands are note shown only the data part of a subframe is shown.

Figure 6A:
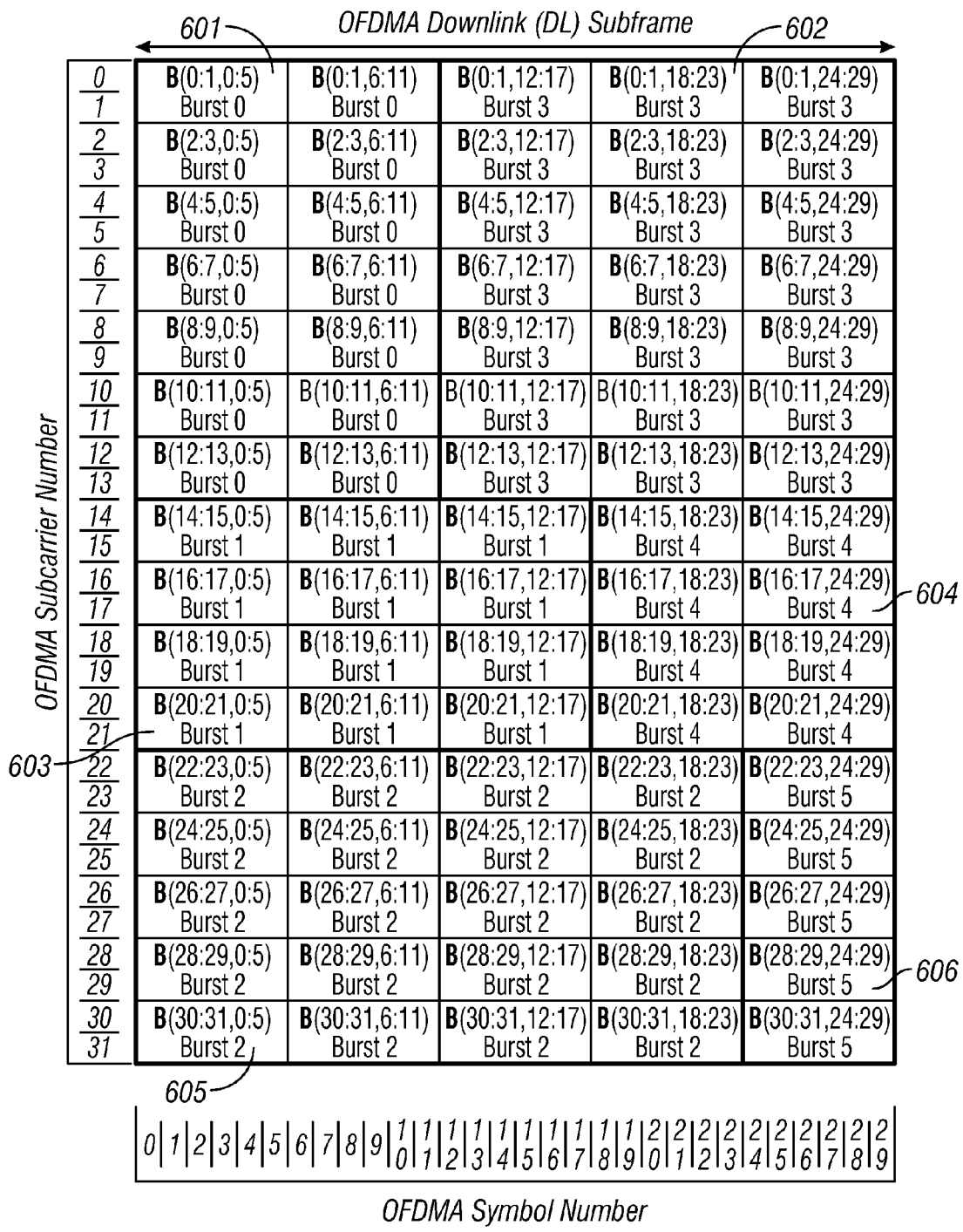
FIG. 6A illustrates an exemplary brick tessellation of OFDMA DL subframe.

In FIG. 6A six bursts are shown within the DL subframes's time-frequency plane. Their heights ($\beta_{H,k}$, k=0, ..., 5) are 14, 8, 10, 14, 8, and 10. Their widths ($\beta_{W,k}$ k=0, ..., 5) are 12, 18, 24, 18, 12 and 6. Computing the GCD of the burst heights and widths gives the maximal brick dimensions r=2 and c=6. The number of bricks used to cover the subframe's bandwidth is $n_R$=16, the number of bricks used to cover subframe's time duration is $n_C$=5.

Figure 6B:
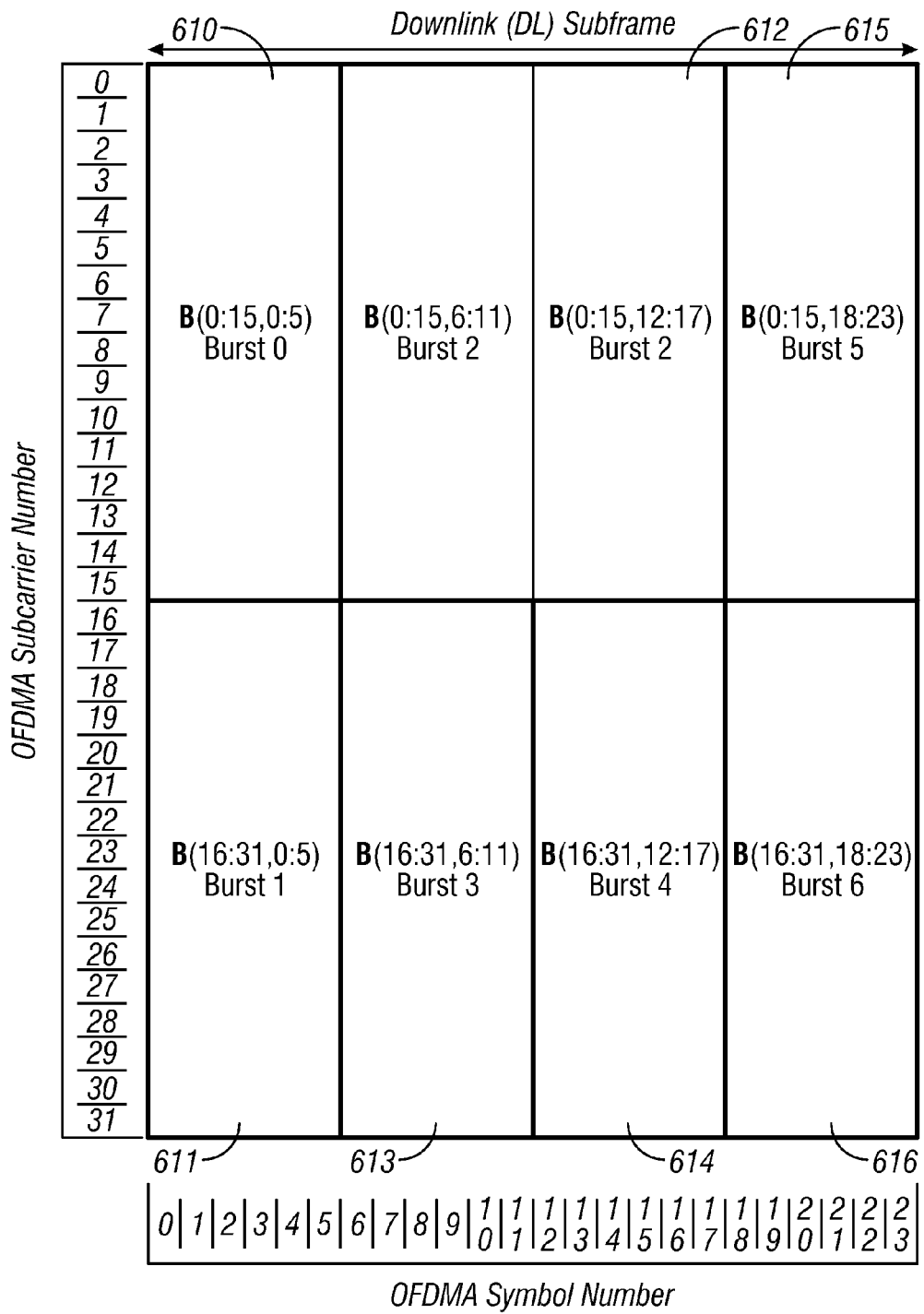
FIG. 6B illustrates an exemplary brick tessellation of OFDMA DL subframe.

In FIG. 6B the maximal brick dimensions are r=16 and c=6. The number of bricks used to cover the subframe's bandwidth is $n_R$=2, the number of bricks used to cover subframe's time duration is $n_C$=4.

Figure 6C:
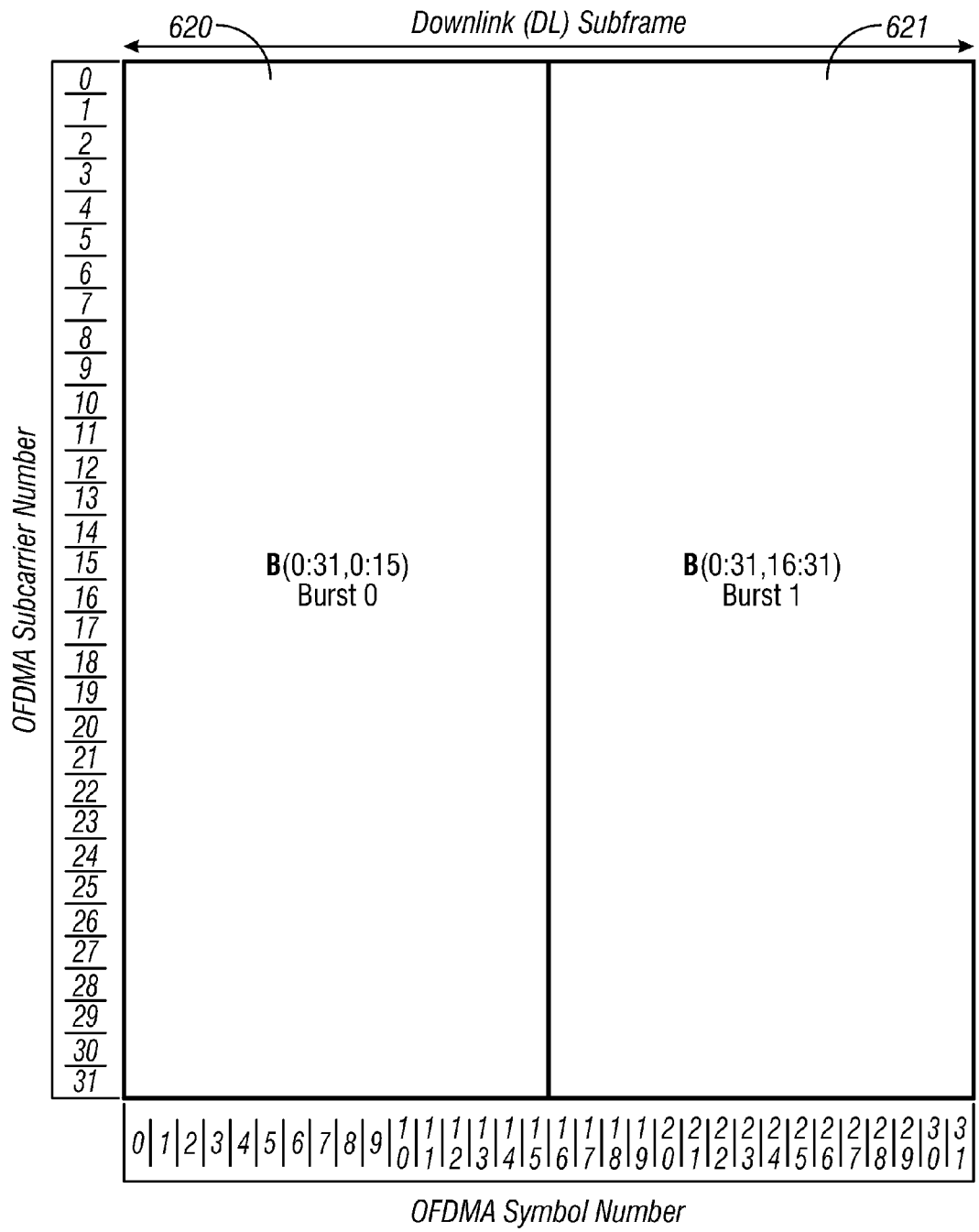
FIG. 6C illustrates an exemplary brick tessellation of OFDMA DL subframe.

In FIG. 6C the maximal brick dimensions are r=32 and c=16. The number of bricks used to cover the subframe's bandwidth is $n_R$=1, the number of bricks used to cover subframe's time duration is $n_C$=2.

In FIG. 6D the maximal brick dimensions are r=2 and c=6. The number of bricks used to cover the subframe's bandwidth is $n_R$=16, the number of bricks used to cover subframe's time duration is $n_C$=4.

Superframe Overhead Reduction Via Brick Tessellated Subframes

According to one embodiment of the invention, a rectangular time-frequency coordinate system for a subframe is formed by perpendicular horizontal and vertical axes. The horizontal axis is called the time axis. The vertical axis is called the frequency axis. The units on the time axis are OFDMA symbols. The units on the frequency axis are OFDMA subcarriers or equivalently physical orthogonal subchannels. The positive direction on the time axis is to the right. The positive direction on the frequency axis is downward. Within this time-frequency coordinate system, a point is defined as x(p, q) with p=0,1, ..., $N_{FFT}$−1 and q≥0. Each point is identified by it coordinates (p,q) where p is the frequency or subcarrier coordinate and q the time coordinate or equivalently the OFDMA symbol coordinate.

Within a subframe's time-frequency coordinate system, the size and location each $\beta_{H,k}$-by-$\beta_{W,k}$ burst within a subframe's time-frequency plane may be specified using four subframe header fields. Specifically, referring to FIG. 6A, 6B, 6C or 6D it is seen that the size and location of the k th burst in a subframe may be represented by the following four subframe header fields:

$$\text{OFDMA\_Symbol\_Offset}[k] \quad (11)$$

$$\text{Number\_of\_Symbols}[k] \quad (12)$$

$$\text{OFDMA\_Subchannel\_Offset}[k] \quad (13)$$

$$\text{Number\_of\_Subchannels}[k] \quad (14)$$

The main purpose and advantage of tessellating subframes with maximal-sized bricks is to reduce the size of these four fields. Using a subframe tessellated with bricks, the location and size of subframe bursts can be specified in units of variable-sized bricks rather than OFDMA subcarriers and OFDMA symbols. Note that bricks serve as units for both the subframe's time and frequency axes; they form a variable brick-based coordinate system in a subframe's time-frequency plane. In addition, a variable brick-based coordinate system allows subframe header fields for burst size and location to be variable in length. The lengths of the four fields may adapt to burst sizes which are dependent on time-varying channel, interference and network conditions.

The brick-based method for frame overhead reduction can be described by again referring to FIG. 6A, 6B, 6C or 6D. Referring to these figures it can be seen that the above four fields can be factored as follows:

$$\text{OFDMA\_Symbol\_Offset}[k] = \text{Burst\_Time\_Offset}[k] * c \quad (15)$$

$$\text{Number\_of\_Symbols}[k] = \text{Burst\_Time\_Duration}[k] * c \quad (16)$$

$$\text{OFDMA\_Subchannel\_Offset}[k] = \text{Burst\_Frequency\_Offset}[k] * r \quad (17)$$

$$\text{Number\_of\_Subchannels}[k] = \text{Burst\_Bandwidth}[k] * r \quad (18)$$

where $$\text{Burst\_Time\_Offset}[k] = \frac{\text{OFDMA\_Symbol\_Offset}[k]}{c} \quad (19)$$

$$\text{Burst\_Time\_Duration}[k] = \frac{\text{Number\_of\_Symbols}[k]}{c} \quad (20)$$

$$\text{Burst\_Frequency\_Offset}[k] = \frac{\text{OFDMA\_Subchannel\_Offset}[k]}{r} \quad (21)$$

$$\text{Burst\_Bandwidth}[k] = \frac{\text{Number\_of\_Subchannels}[k]}{r} \quad (22)$$

It can be seen that the brick-scaled fields 19 through 22 are scaled versions of equations 11 through 14 so a reduced number of bits is needed for their binary representation. The scale factors are brick dimensions r and c that should be as large as possible to maximize the reduction in the number of bits. Dimensions r and c may also change from subframe to subframe so scaling can be variable.

Hence, if brick dimensions r and c are known at the transmit and receive ends of a link, the scaled fields (19 through 22) may be transmitted rather than the original non-scaled fields (11 through 14). Brick dimensions r and c may be computed at the transmit end of a link and then transmitted to a receiver, the receiver can locate its bursts using equations 15 through 18, the received scaled fields, and knowledge of r and c. It must be emphasized that r and c only need to be computed and transmitted once per subframe, not per subframe burst. Hence the increase in additional overhead required for r and c is small.

To illustrate the advantages in using brick-scaled fields, FIG. 6A, 6B, 6C and 6D may be used. Referring to FIG. 6A it can be seen that size and location of Burst 4 (k=4) may be represented by the field values OFDMA_Symbol_Offset[k]=18 (8 bits)
Number_of_Symbols[k]=12 (7 bits)
OFDMA_Subchannel_Offset[k]=14 (6 bits)
Number_of_Subchannels[k]=8 (6 bits)

Maximal brick dimensions for the DL subframe in FIG. 6A are r=2 and c=6. Hence the brick-scaled subframe header fields for Burst 4 are defined as $$\text{Burst\_Time\_Offset}[k] = \frac{\text{OFDMA\_Symbol\_Offset}[k]}{c}$$
$$= 3(2 \text{ bits})$$

$$\text{Burst\_Time\_Duration}[k] = \frac{\text{Number\_of\_Symbols}[k]}{c}$$
$$= 2(2 \text{ bits})$$

$$\text{Burst\_Frequency\_Offset}[k] = \frac{\text{OFDMA\_Subchannel\_Offset}[k]}{r}$$
$$= 7(3 \text{ bits})$$

$$\text{Burst\_Bandwidth}[k] = \frac{\text{Number\_of\_Subchannels}[k]}{r}$$
$$= 4(3 \text{ bits})$$

Note that the brick-based fields require only 10 bits compared to fields the original non-scaled fields which require 27 bits.

The Table of Field Values in FIG. 6A shows brick-based field values for all bursts within the DL subframe. Each table pair contains a field's decimal value and the number of bits required to represent the decimal value within a transmitted subframe field. The table also shows the total number of overhead bits for the brick-scaled method and the non-scaled or prior art method. Percent decreases in overhead bits are also shown. Note for the bursts within FIG. 6A the overall decrease in overhead bits is 69% which is significant.

Referring to the Table of Field Values in FIG. 6B, 6C and 6D it is seen that overall decrease in overhead bits is 84%, 85% and 84%. FIG. 6A, 6B, 6C and 6D may be viewed as a sequence of successive DL frames. The brick dimensions r and c are adapted to the bursts for each subframe using the GCD equations above. The average overall decrease in overhead bits is 80% compared to the non-scaled or prior art method. Hence, compared to prior art the brick-scaled method will allow a significant number of subcarriers to be used for other required subframe header fields.

Brick-Based OFDMA Superframes

Figure 5A:
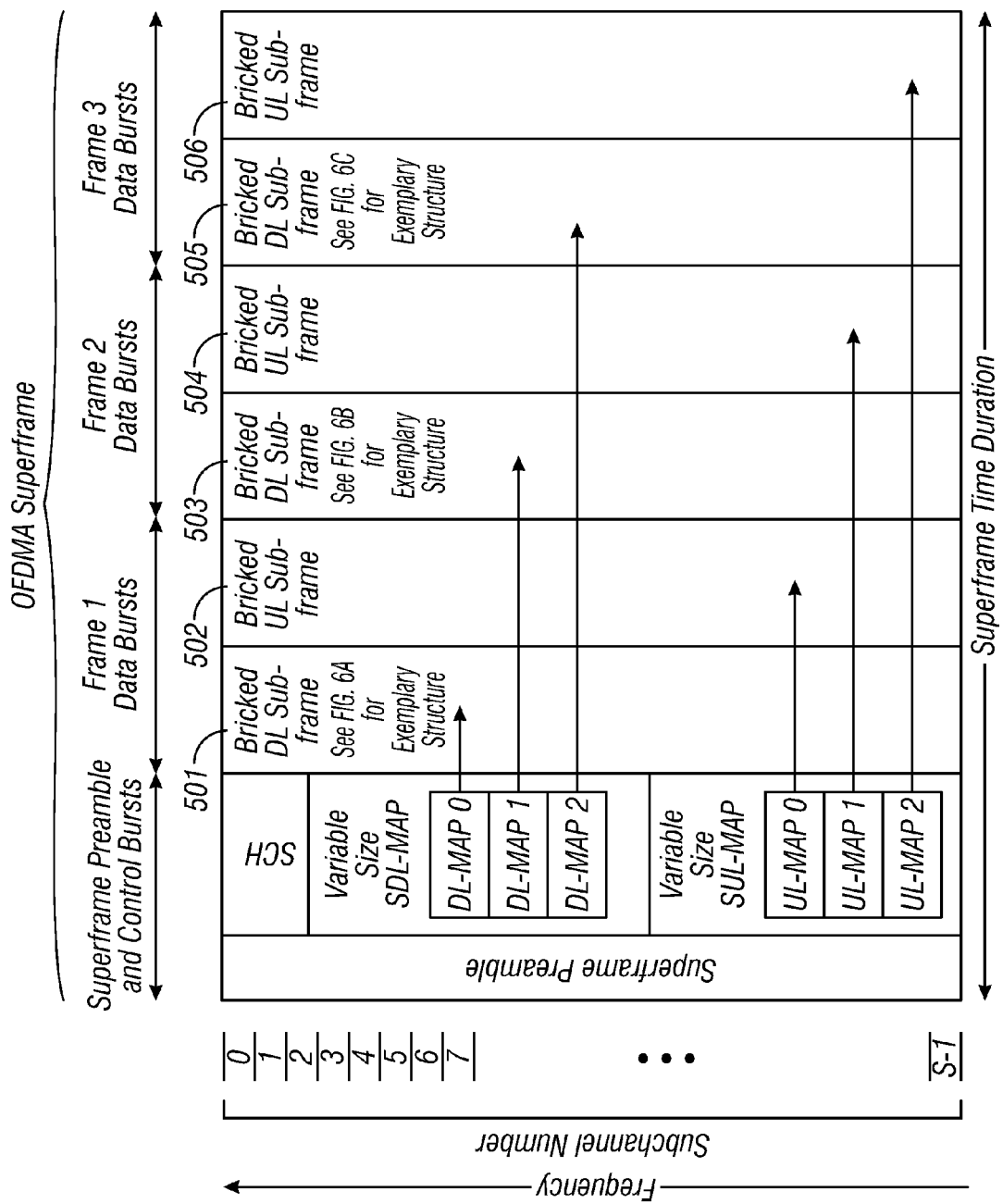
FIG. 5A illustrates an exemplary brick-based OFDMA superframe with symmetric 1:1 DL/UL ratio.

FIG. 5A shows an exemplary brick-based superframe structure. Preferred embodiments of the invention are based on this basic OFDMA superframe or variations of it. The exemplary superframe contains a Superframe Preamble, a Superframe Control Header (SCH), a Superframe Downlink Map (SDL-MAP), a Superframe Uplink MAP (SUL-MAP) and brick-based downlink and uplink subframes that support OFDMA user data. FIG. 6A, 6B, 6C and 6D show examples of brick-based DL subframes that may comprise the superframe of FIG. 5A. Information Elements within the SDL-MAP and the SUL-MAP provide the necessary control data needed for superframe configuration and changes. Information Elements within the SDL-MAP and the SUL-MAP also specify the brick tessellations to be used for each DL and UL subframe. Note that if the exemplary superframe contains only one frame it reduces to the IEEE 802.16 frame structure used in prior art. Hence the exemplary superframe structure subsumes the prior art frame structures illustrated in FIGS. 1A, 1B, 1C, 2A and 2B.

The exemplary superframe structure is very general and can be modified or extended in many ways. For example, (1) the superframe structure can be modified to allow for different physical layer technologies to be interlaced, these technologies may not use a brick-based superframe structure described above; (2) different types of logical channels may be mapped to sets of subcarriers within the superframe control or data sections, they may be used rather the SCH, SDL-MAP, and SUL-MAP; (3) the superframe structure of FIG. 5a has a downlink-uplink asymmetry ratio of 1-to-1 in which one downlink subframe is followed by one uplink subframe, this asymmetry ratio could be varied.

Figure 5B:
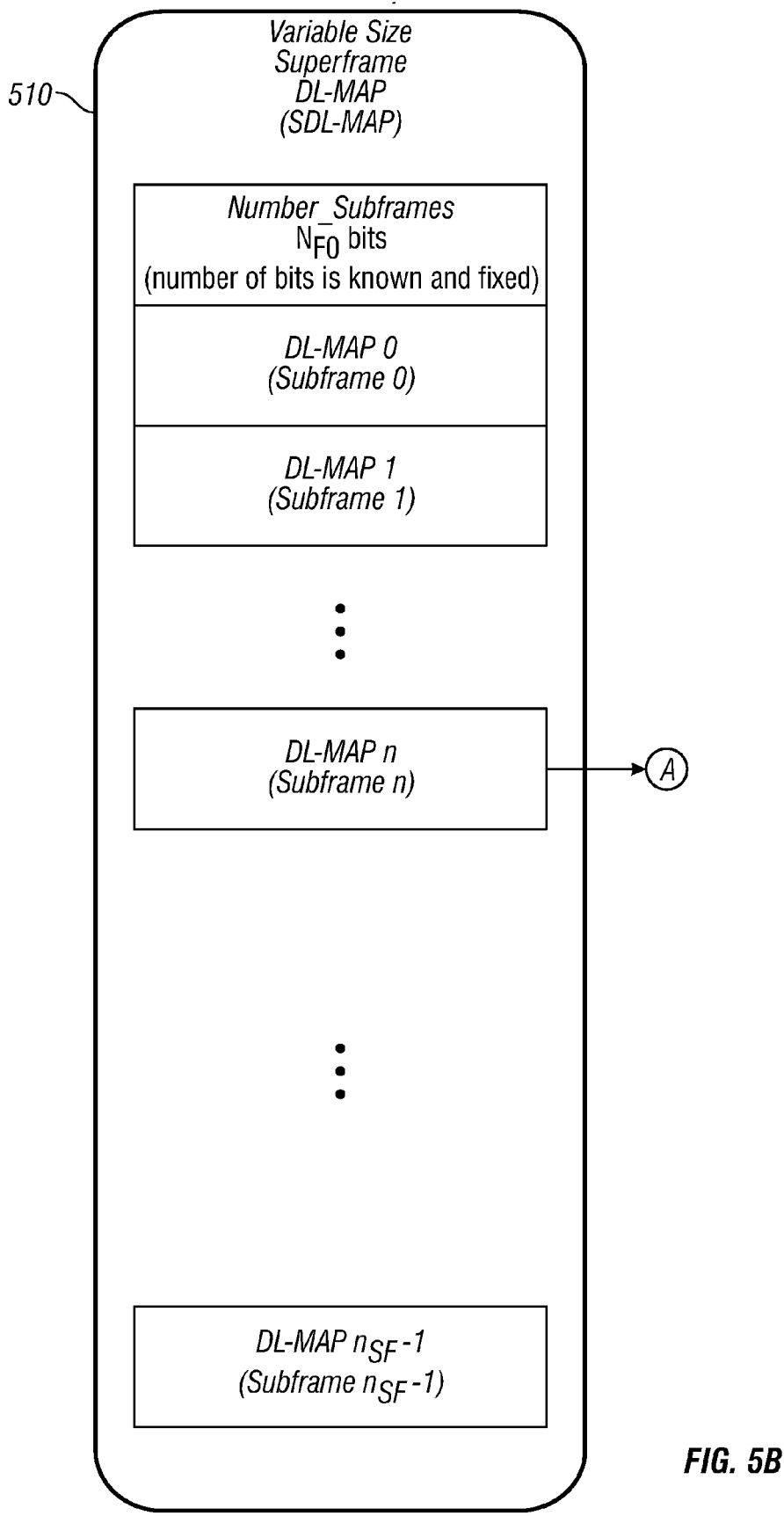
FIG. 5B illustrates exemplary fields for a variable size superframe DL-MAP (SDL-MAP).
Figure 5B:
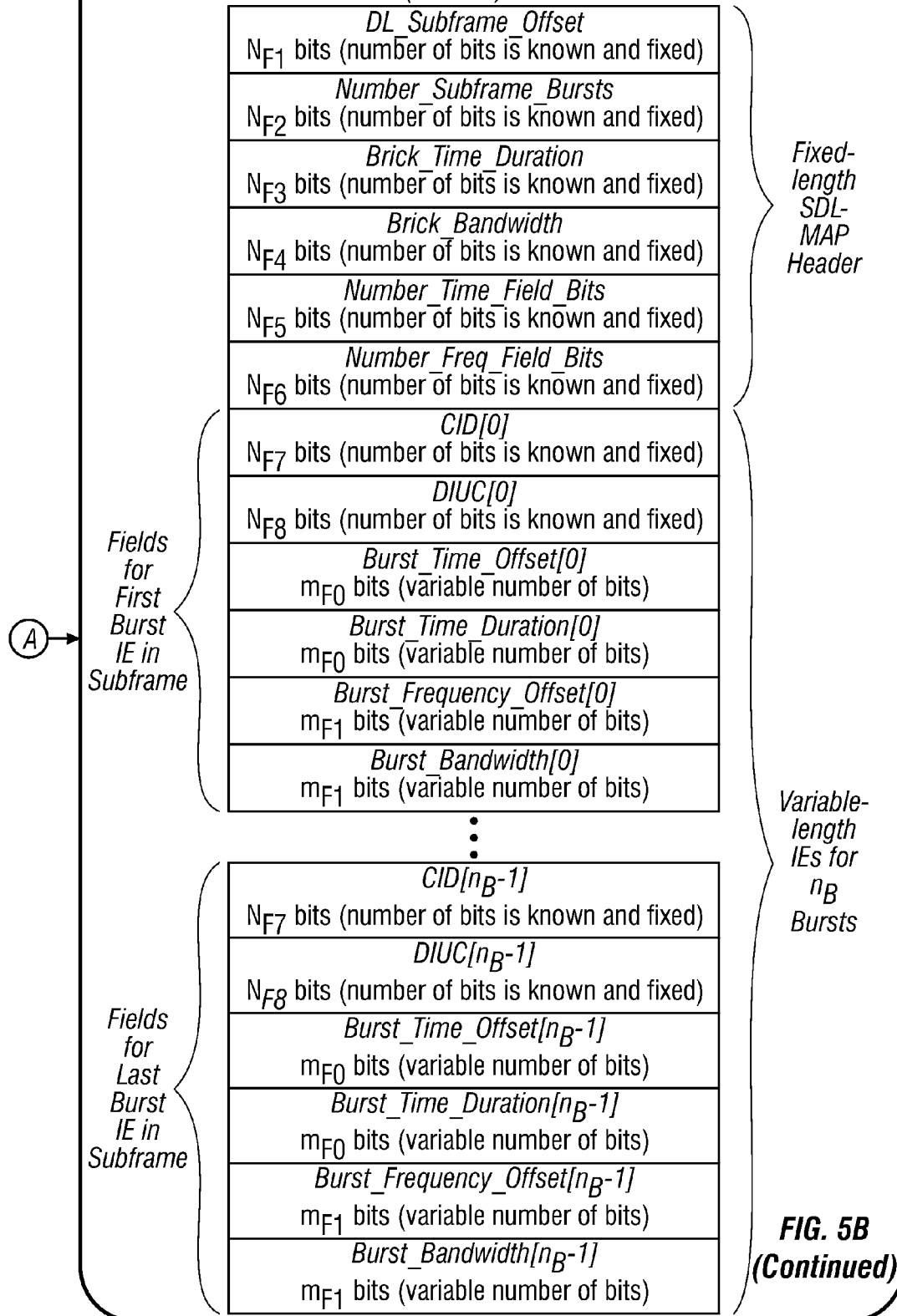
Figure 5C:
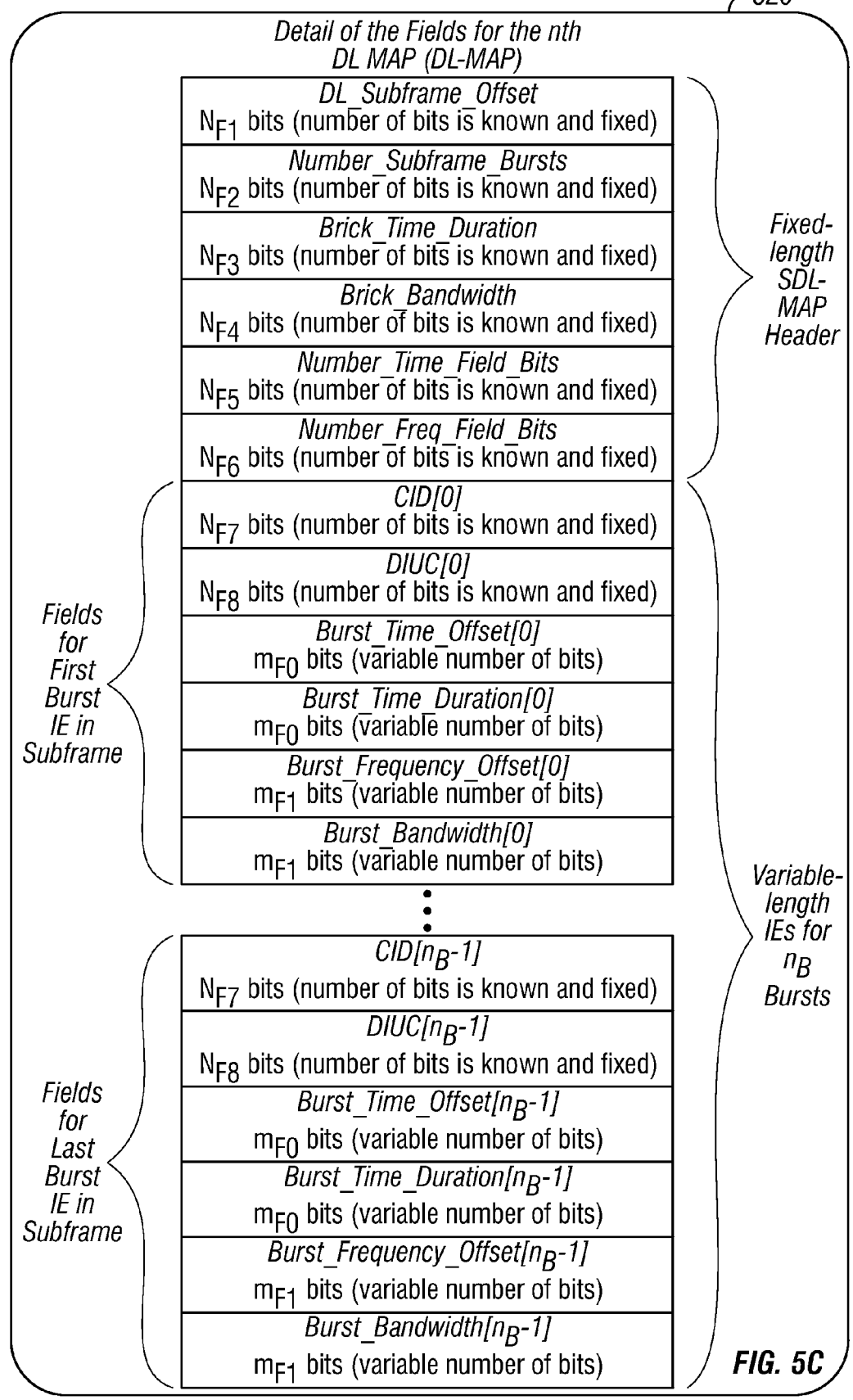
FIG. 5C illustrates exemplary brick-based fields for a DL-MAP.

FIG. 5B shows exemplary fields for the superframe's SDL-MAP 510. The SUL-MAP will have a similar structure so it is not necessary to illustrate and describe its fields. Other superframe header fields may be added to the SDL-MAP and the SUL-MAP if required. Values within the SDL-MAP and SUL-MAP fields are broadcast to all OFDMA users. The broadcasted values are received and read by all users so they can prepare for subsequent subframe information elements. The subframe information elements tell OFDMA users how and where to access their data bursts within a subframe.

As shown in FIG. 5B the SDL-MAP 510 is comprised of a Number_Subframes field and a total of $n_{SF}$ DL-MAPs. The Number_Subframes field and DL-MAP fields are transmitted from top to bottom in sequential order. Hence the fields can be sequentially loaded into in a RAM buffer at the transmit end and sequentially read from a RAM buffer at the receive end of a link.

Referring to FIG. 5B the Number_Subframes field contains the total number $n_{SF}$ of DL subframes within a DL superframe. Each DL subframe is configured using a single DL-MAP so the number of subframes $n_{SF}$ equals the number of DL-MAPs. Note that if $n_{SF}=1$ the exemplary superframe contains only one frame and the superframe structure reduces to the IEEE 802.16 frame structure used in prior art. The number of DL subframes $n_{SF} \geq 1$ is variable but the length of the Number_Subframes field is fixed at $N_{F0}$ bits. For example, if the maximum number of DL subframes allowed is 64, the length of the Number_Subframes field would be fixed at $N_{F0}=6$ bits in order to support 64 DL subframes numbered from 0 to 63. The number of DL subframes $n_{SF}$ could then be any positive integer ranging from 0 to 63.

FIG. 5B also shows the detail of the n th DL-MAP 511 within a set of $n_{SF}$ DL-MAPs. The detail for each of the $n_{SF}$ DL-MAPs is the same; each DL-MAP is comprised of fixed and variable length fields. The n th DL-MAP is used to configure or allocate bursts within the n th DL subframe.

The first six fields within the n th DL-MAP are SDL-MAP header fields that are fixed in length, they are defined as follows:

The DL_Subframe_Offset field has a fixed length of $N_{F1}$ bits, binary values contained within this field specify the integer-valued offset of n th DL subframe within a DL superframe. The n th subframe DL subframe starts at the value given in the DL_Subframe_Offset field.

The Number_Subframe_Bursts field has a fixed length of $N_{F2}$ bits, binary values contained within this field specify the number $n_B$ of subframe bursts allocated to the n th DL subframe.

The Brick_Time_Duration field has a fixed length of $N_{F3}$ bits, binary values contained within this field specify the time duration of the subframe bricks that tessellate the n th DL subframe. Brick time duration equals the number of columns c that comprise a brick:

$$c = GCD(\beta_{W,0}, \beta_{W,1}, \ldots \beta_{W,n_B-1}) = \text{Brick\_Time\_Duration} \quad (23)$$

The Brick_Bandwidth field has a fixed length of $N_{F4}$ bits, binary values contained within this field specify the bandwidth of a subframe bricks that tessellate the n th DL subframe. Brick bandwidth equals the number of rows r that comprise a brick:

$$r = GCD(\beta_{H,0}, \beta_{H,1}, \ldots, \beta_{n_B-1}) = \text{Brick\_Bandwidth} \quad (24)$$

The Number_Time_Field_Bits field has a fixed length of $N_{F5}$ bits, binary values $m_{F0}$ contained within this field specify the lengths of the variable-length fields Burst_Time_Offset

[k] and Burst_Time_Duration[k], k=0,1, ..., $n_B$−1. These variable-length fields are components of the burst Information Elements.

The Number_Freq_Field_Bits field has a fixed length of $N_{F6}$ bits, binary values $m_{F1}$ contained within this field specify the lengths of the variable-length fields Burst_Frequency_Offset[k] and Burst_Bandwidth[k], k=0,1, ..., $n_B$−1. These variable-length fields are components of the burst Information Elements.

Following the above six SDL-MAP header fields is a variable-length sequence of $n_B$≥1 Information Elements that describe the n th subframe's bursts. Fields comprising the k (k=0,1, ..., $n_B$−1) Information Elements (IEs) are both fixed and variable in length, they are defined as follows:

Each CID[k] field has a fixed length of $N_{F7}$ bits, binary values contained within this field specify the user or connection identifier (CID) for the k th burst in the n th subframe DL subframe.

Each DIUC[k] field has a fixed length of $N_{F8}$ bits, binary values contained within this field specify the Downlink Interval Usage Code (DIUC) for the k th burst in the n th subframe DL subframe.

Each Burst_Time_Offset[k] field has a length of $m_{F0}$ bits, binary values contained within this field specify the time offset of the k th subframe burst in units of r-by-c bricks. The reference used for the time offset computation is the value given in the preceding DL_Subframe_Offset field.

Each Burst_Time_Duration[k] field has a length of $m_{F0}$ bits, binary values contained within this field specify the time duration of the k th subframe burst in units of r-by-c bricks.

Each Burst_Frequency_Offset[k] field has a length of $m_{F1}$ bits, binary values contained within this field specify the frequency offset of the k th subframe burst in units of r-by-c bricks. The reference used for the frequency offset computation is first subcarrier (0th subcarrier).

Each Burst_Bandwidth[k] field has a length of $m_{F1}$ bits, binary values contained within this field specify the bandwidth of the k th subframe burst in units of r-by-c bricks.

For the above Information Element fields, field length $m_{F0}$ is variable and is contained within the preceding Number_Time_Field_Bits field. Similarly, field length $m_{F1}$ is variable and is contained within the preceding Number_Freq_Field_Bits field. Variables $m_{F0}$ and $m_{F1}$ are read prior to the $n_B$ IE fields and allow for adaptation in frame overhead.

Superframe Assembly Method

Using the above defined superframe header fields and referring to the exemplary superframe shown in FIG. 5A a method for generating downlink (DL) subframes within a superframe is now described. The method for generating uplink subframes is similar so it is not necessary to describe the UL method.

Figure 7A:
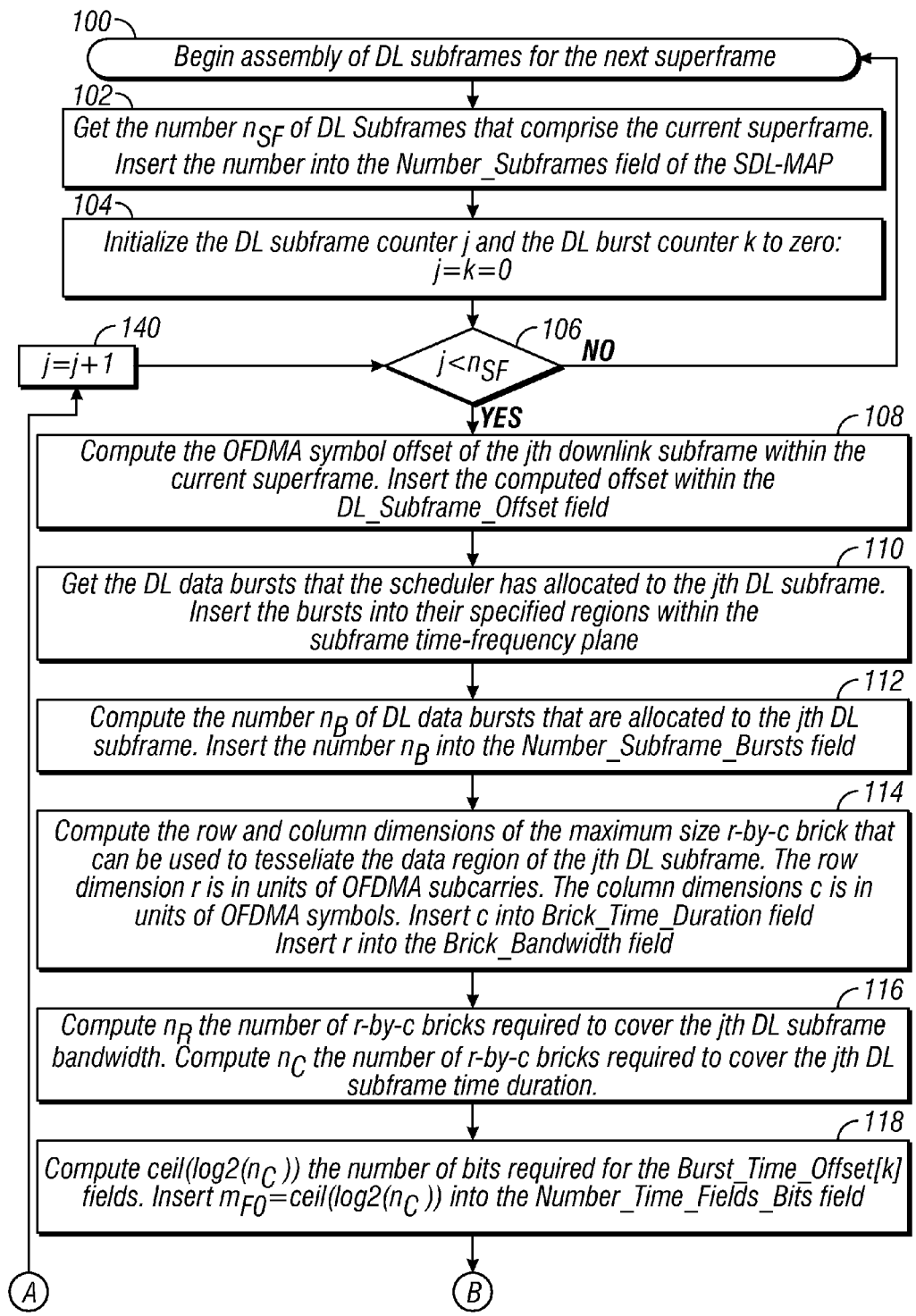
FIG. 7A shows an exemplary method flowchart for SDL-MAP assembly.
Figure 7A:
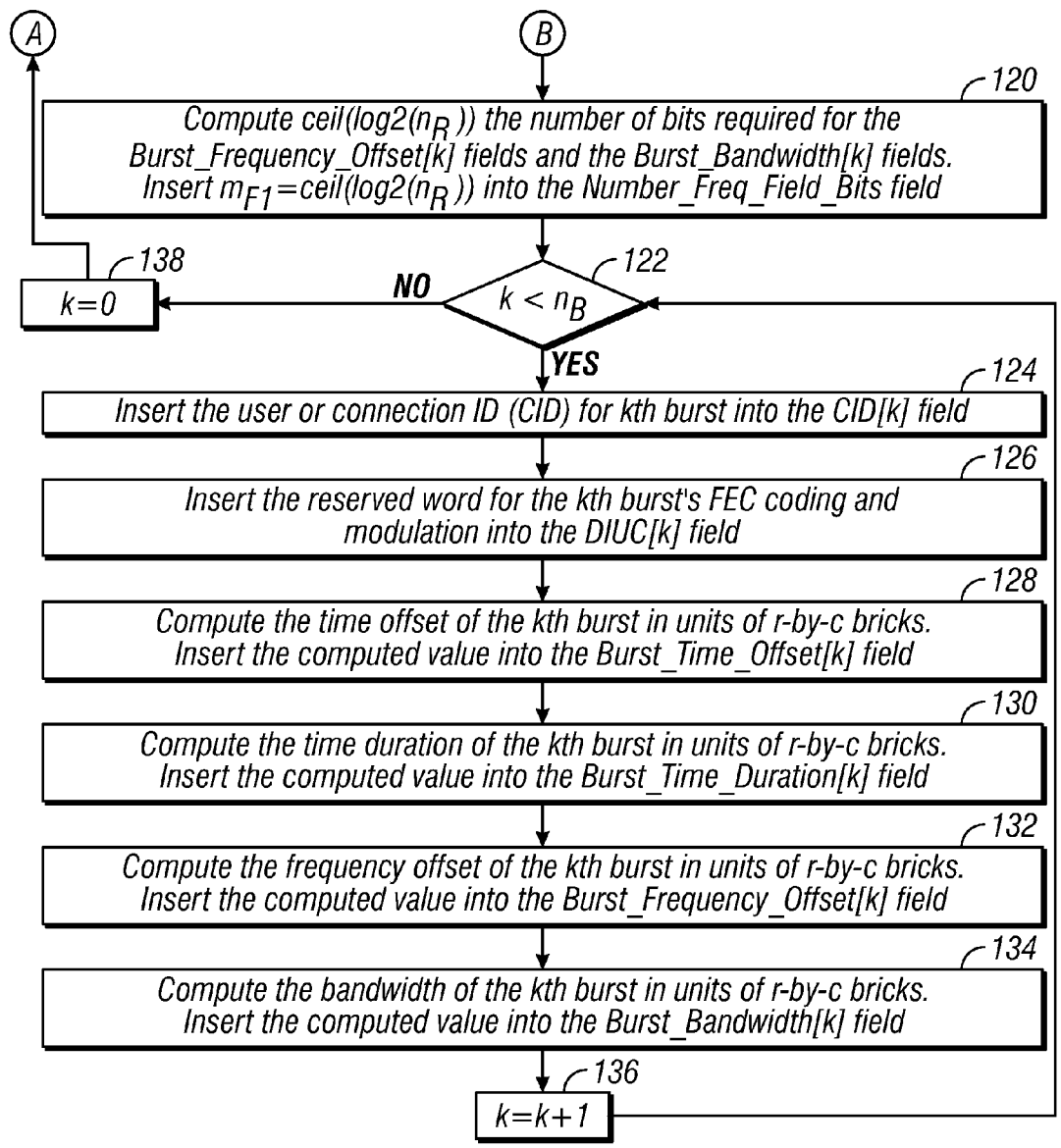

FIG. 7A shows an exemplary flowchart for generating the DL subframes within a superframe. The flowchart is divided into two processes. The first process (Steps 108 to 120) describes the steps for assembling SDL-MAP components. The second process (Steps 124 to 134) describes the steps for assembling information elements within the SDL-MAP.

In Step 100 the method for constructing DL subframes within the current superframe begins.

In Step 102 the binary representation of integer $n_{SF}$≤0 is inserted into the fixed length-$N_{F0}$ Number_Subframes field. $n_{SF}$ specifies the number of downlink subframes within the current superframe, it may be specified by a scheduler. FIG. 5B shows the location of the Number_Subframes field within the SDL-MAP.

In Step 104 counter variables j and k are initialized to zero. Counter variable j is used for counting subframes within the current superframe, counter variable k for counting the number of bursts within the j th subframe. Counter j is also needed to address subframes within a superframe, counter k to address bursts within subframes.

In Step 106 the current value of the subframe counter j is compared to $n_{SF}$ to see which processing steps to execute next. If the subframe counter j is less than number of downlink subframes $n_{SF}$, the method enters the process for constructing header fields within the j th SDL-MAP. If the subframe counter j is greater than or equal to $n_{SF}$ the method returns to Step 100 in order to restart the assembly method for the next superframe.

In Step 108 the downlink SDL-MAP process begins by computing the OFDMA symbol offset of the j th DL subframe within the current superframe. In the preferred embodiment, the offset is in units of OFDMA symbols using the superframe preamble as a reference point for the offset computation. The binary representation of the computed length-$N_{F1}$ value is inserted into the DL_Subframe_Offset field of the SDL-MAP header. FIG. 5B shows the location of the DL_Subframe_Offset field within the SDL-MAP.

In Step 110 the user data bursts that are allocated to the j th DL subframe are first obtained from the scheduler. The bursts are then inserted into their scheduler specified regions within the time-frequency plane of the j th subframe. Subframe bursts may be of various sizes, their sizes are parametrized by their heights ($\beta_{H,k}$, k=0, ..., $n_B$−1) and their widths ($\beta_{W,k}$, k=0, ..., $n_B$−1). Burst heights $\beta_{H,k}$ are in units of OFDMA subcarriers, burst widths $\beta_{W,k}$ are in units of OFDMA symbols.

In Step 112 the number $n_B$ of data bursts that are allocated to the j th DL subframe is computed. The binary representation of the computed length-$N_{F2}$ value $n_B$ is inserted into the Number_Subframe_Bursts field of the SDL-MAP header. This value is also used as an upper limit for the burst counter k. FIG. 5B shows the location of the Number_Subframe_Bursts field within the superframe header.

In Step 114 the row and column dimensions of the maximum size r-by-c brick that can be used to tessellate the data region of the j th subframe is computed. To compute the row dimension r the greatest common divisor (GCD) of data burst heights ($\beta_{H,k}$, k=0, ..., $n_B$−1) in units of OFDMA subcarriers is computed. To compute the column dimension c the GCD of data burst widths ($\beta_{W,k}$, =0, ..., $n_B$−1) in units of OFDMA symbols is computed. The binary representation of the computed dimension r is inserted into the length-$N_{F4}$ Brick_Bandwidth field. The binary representation of the computed dimension c is inserted into the length-$N_{F3}$ Brick_Time_Duration field. FIG. 5B shows the location of the Brick_Time_Duration field and the Brick_Bandwidth field within the superframe header.

In Step 116 the number of r-by-c bricks $n_R$=$N_{FFT}$/r required to cover the j th subframe's bandwidth and the number of r-by-c bricks $n_C$=$N_{Symbls}$/c required to cover the j th subframe's time duration are computed. $N_{FFT}$ denotes the number of OFDMA subcarriers and $N_{Symbls}$ the number of OFDMA symbols within the subframe. The value for $N_{FFT}$ is typically computed during the network entry process. The number of bricks required to tessellate the current subframe is the product $n_R \times n_C$. FIG. 6A, 6B, 6C and 6D show exemplary brick tessellations for an exemplary sequence OFDMA downlink subframes. In FIG. 6A, $n_R$=16 and $n_C$=5. In FIG. 6B, $n_R$=2 and $n_C$=4. In FIG. 6C, $n_R$=1 and $n_C$=2. In FIG. 6D, $n_R$=16 and $n_C$=4.

In Step 118 integer $m_{F0}$ is computed using the operation $m_{F0}=\text{ceil}(\log_2(n_C))$ where $\text{ceil}(\log_2(n_C))$ rounds $\log_2(n_C)$ to the nearest integer towards infinity. The binary representation of the computed value $m_{F0}$ is then inserted into the Number_Time_Field_Bits field of the IE header. FIG. 5B shows the location of the Number_Time_Field_Bits field within the superframe header. The Number_Time_Field_Bits field has a fixed length of $N_{F5}$ bits. The value $m_{F0}$ contained within this field specifies the lengths of fields Burst_Time_Offset[k] and Burst_Time_Duration[k], k=0,1, . . . , $n_B$–1. These fields are components of the burst Information Elements. At the receive end, the received contents $m_{F0}$ of the Number_Time_Field_Bits field is read in order to determine the locations of Burst_Time_Offset[k] and Burst_Time_Duration[k] within a sequence of $n_B$ information elements that follow the SDL MAP header. Note that the lengths of the Burst_Time_Offset [k] and Burst_Time_Duration[k] fields may be time-varying, their lengths dependent on the computed value $n_C$. Hence the Number_Time_Field_Bits field is necessary to adapt the lengths of variable-length fields Burst_Time_Offset[k] and Burst_Time_Duration[k].

In Step 120 integer $m_{F1}$ is computed using the operation $m_{F1}=\text{ceil}(\log_2(n_R))$ where $\text{ceil}(\log_2(n_R))$ rounds $\log_2(n_R)$ to the nearest integer towards infinity. The binary representation of the computed value $m_{F1}$ is then inserted into the Number_Freq_Field_Bits field of the IE header. FIG. 5B shows the location of the Number_Freq_Field_Bits field within the superframe header. The Number_Freq_Field_Bits field has a fixed length of $N_{F6}$ bits. The value $m_{F1}$ contained within this field specifies the lengths of the fields Burst_Frequency_Offset[k] and Burst_Bandwidth[k], k=0,1, . . . , $n_B$–1. These fields are components of the burst Information Elements. At the receive end, the received contents $m_{F1}$ of the Number_Freq_Field_Bits field is read in order to determine the locations of Burst_Frequency_Offset[k] and Burst_Bandwidth[k] within a sequence of $n_B$ information elements that follow the SDL MAP header. Note that the lengths of the Burst_Frequency_Offset[k] and Burst_Bandwidth[k] fields may be time-varying with length dependent on the computed value $n_R$. Hence the Number_Freq_Field_Bits field is necessary to adapt the lengths of variable-length fields Burst_Frequency_Offset[k] and Burst_Bandwidth[k].

In Step 122 the current value of the burst counter k is compared to $n_B$ to see which processing steps to execute next. If the burst counter k is less than number of downlink subframe bursts $n_B$, the method enters the process (Steps 124 to 134) for constructing burst information element fields within the j th SDL-MAP. If the burst counter k is greater than or equal to $n_B$, all bursts allocated for the j th subframe have been processed so the method goes to Step 138 where the burst counter k is reset to zero. The method then goes to Step 140 where the subframe counter j is incremented by one. After Step 140 the method returns to Step 106.

In Step 124 the OFDMA connection or user identification bits for the k th burst are inserted into the CID[k] field of the k th burst information element. FIG. 5B shows the locations of the CID[k], k=0,1, . . . , $n_B$–1, fields within the $n_B$ burst information elements of the DL-MAP. Each of the CID[k] fields has a fixed length of $N_{F7}$ bits.

In Step 126 modulation and FEC coding descriptor bits are inserted into the Downlink Interval Usage Code (DIUC) field within the k th burst information element. The DIUC is a fixed length-$N_{F8}$ code identifying the FEC coding and modulation that is used for the k th burst. FIG. 5B shows the locations of the fields DIUC[k], k=0,1, . . . , $n_B$–1, within the $n_B$ burst information elements of the DL-MAP.

In Step 128 the time offset of the k th subframe burst is computed in units of r-by-c bricks. The binary representation of the computed value is inserted into the Burst_Time_Offset [k] field of the DL-MAP. The Burst_Time_Offset[k] field has a variable of $m_{F0}$ bits. The integer $m_{F0}$ is computed in Step 118. Brick dimensions r and c are the greatest common divisors of data burst bandwidths in units of OFDMA subcarriers and data burst time durations in units of OFDMA symbols. These values were computed in Step 114. The reference used for the time offset computation is the value given in the DL_Subframe_Offset field computed in Step 108. FIG. 5B shows the locations of the fields Burst_Time_Offset[k], k=0, 1, . . . , $n_B$–1, within the $n_B$ burst information elements of the DL-MAP.

FIG. 6A, 6B, and 6C show exemplary brick tessellations of the data regions for a sequence OFDMA downlink subframes. Within FIG. 6A, values for Burst_Time_Offset[k] in units of r-by-c bricks for bursts k=0,1,2,3,4,5 are 0, 0, 0, 2, 3 and 4. Within FIG. 6B, values for Burst_Time_Offset[k] in units of of r-by-c bricks for bursts k=0,1,2,3,4,5,6 are 0, 0, 1, 1, 2, 3 and 3. Within FIG. 6C, values for Burst_Time_Offset [k] in units of of r-by-c bricks for bursts k=0,1 are 0 and 1. Hence it can be seen that the number of bits for Burst_Time_Offset[k] decreases as brick size increases. This results in a decrease in overhead and also allows for adaptation based on burst size.

In Step 130 the time duration of the k th subframe burst is computed in units of r-by-c bricks. The binary representation of the computed value is inserted into the Burst_Time_Duration[k] field of the of the DL-MAP. The Burst_Time_Duration[k] field has a length of $m_{F0}$ bits. The integer $m_{F0}$ is computed in Step 118. Brick dimensions r and c are the greatest common divisors of data burst bandwidths in units of OFDMA subcarriers and data burst time durations in units of OFDMA symbols. These values were computed in Step 114. FIG. 5B shows the locations of the fields Burst_Time_Duration[k], k=0,1, . . . , $n_B$–1, within the $n_B$ burst information elements of the DL-MAP.

FIG. 6A, 6B, and 6C show exemplary brick tessellations of the data regions for a sequence OFDMA downlink subframes. Within FIG. 6A, values for Burst_Time_Duration[k] in units of r-by-c bricks for bursts k=0,1,2,3,4,5 are 1, 2, 3, 2, 1 and 0. Within FIG. 6B, values for Burst_Time_Duration[k] in units of of r-by-c bricks for bursts k=0,1,2,3,4,5,6 are 0, 0, 1, 0, 0, 0 and 0. Within FIG. 6C, values for Burst_Time_Duration[k] in units of of r-by-c bricks for bursts k=0,1 are 0 and 0. Hence it can be seen that the number of bits for Burst_Time_Duration[k] decreases as brick size increases. This results in a decrease in overhead and also allows for adaptation based on burst size.

In Step 132 the frequency or subcarrier offset of the k th subframe burst is computed in units of r-by-c bricks. The binary representation of the computed value is inserted into the Burst_Frequency_Offset[k] field of the of the DL-MAP. The Burst_Frequency_Offset[k] field has a length of $m_{F1}$ bits. The integer $m_{F1}$ is computed in Step 120. Brick dimensions r and c are the greatest common divisors of data burst bandwidths in units of OFDMA subcarriers and data burst time durations in units of OFDMA symbols. These values were computed in Step 114. FIG. 5B shows the locations of the fields Burst_Frequency_Offset[k], k=0,1, . . . , $n_B$–1, within the $n_B$ burst information elements of the DL-MAP.

FIG. 6A, 6B, and 6C show exemplary brick tessellations of the data regions for a sequence OFDMA downlink subframes. Within FIG. 6A, values for Burst_Frequency_Offset [k] in units of r-by-c bricks for bursts k=0,1,2,3,4,5 are 0, 7, 11, 0, 7 and 4. Within FIG. 6B, values for Burst_Frequency_Offset[k] in units of of r-by-c bricks for bursts k=0,1,2,3, 4,5,6 are 0, 1, 0, 1, 1, 0 and 1. Within FIG. 6C, values for Burst_Frequency_Offset[k] in units of of r-by-c bricks for bursts k=0,1 are 0 and 0. Hence it can be seen that the number of bits for Burst_Frequency_Offset[k] decreases as brick size increases. This results in a decrease in overhead and also allows for adaptation based on burst size.

In Step 134 the bandwidth of the k th subframe burst is computed in units of r-by-c bricks. The binary representation of the computed value is inserted into the Burst_Bandwidth [k] field of the of the DL-MAP. The Burst_Bandwidth[k] field has a length of $m_{F1}$ bits. The integer $m_{F1}$ is computed in Step 120. Brick dimensions r and c are the greatest common divisors of data burst bandwidths in units of OFDMA subcarriers and data burst time durations in units of OFDMA symbols. These values were computed in Step 114. FIG. 5B shows the locations of the fields Burst_Bandwidth[k], k=0,1, . . . , $n_B$–1, within the $n_B$ burst information elements of the DL-MAP.

FIG. 6A, 6B, and 6C show exemplary brick tessellations of the data regions for a sequence OFDMA downlink subframes. Within FIG. 6A, values for Burst_Bandwidth[k] in units of r-by-c bricks for bursts k=0,1,2,3,4,5 are 6, 3, 4, 6, 3 and 4. Within FIG. 6B, values for Burst_Bandwidth[k] in units of of r-by-c bricks for bursts k=0,1,2,3,4,5,6 are 0, 0, 0, 0, 0, 0 and 0. Within FIG. 6C, values for Burst_Bandwidth[k] in units of of r-by-c bricks for bursts k=0,1 are 0 and 0. Hence it can be seen that the number of bits for Burst_Bandwidth[k] decreases as brick size increases. This results in a decrease in overhead and also allows for adaptation based on burst size.

In Step 136 the burst counter k is incremented by one. After Step 136 the method returns to Step 122 in order to restart the construction process for the next DL burst information element.

Superframe Disassembly Method

Referring to the exemplary superframe shown in FIG. 5A, a method for disassembling downlink (DL) subframes within a superframe is now described. The method for disassembling uplink subframes is similar so it is not described.

Figure 7B:
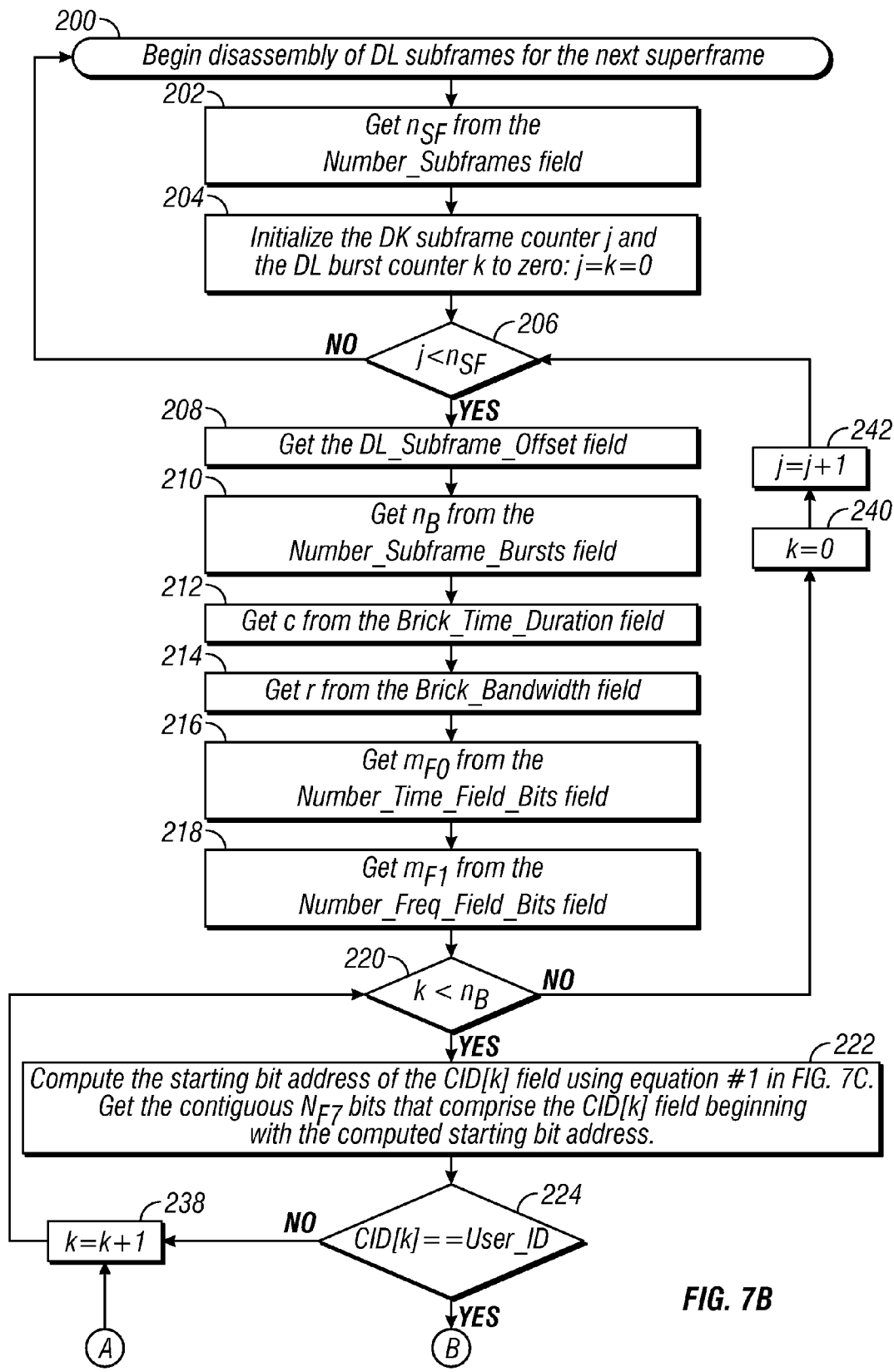
FIG. 7B shows an exemplary method flowchart for SDL-MAP disassembly.
Figure 7B:
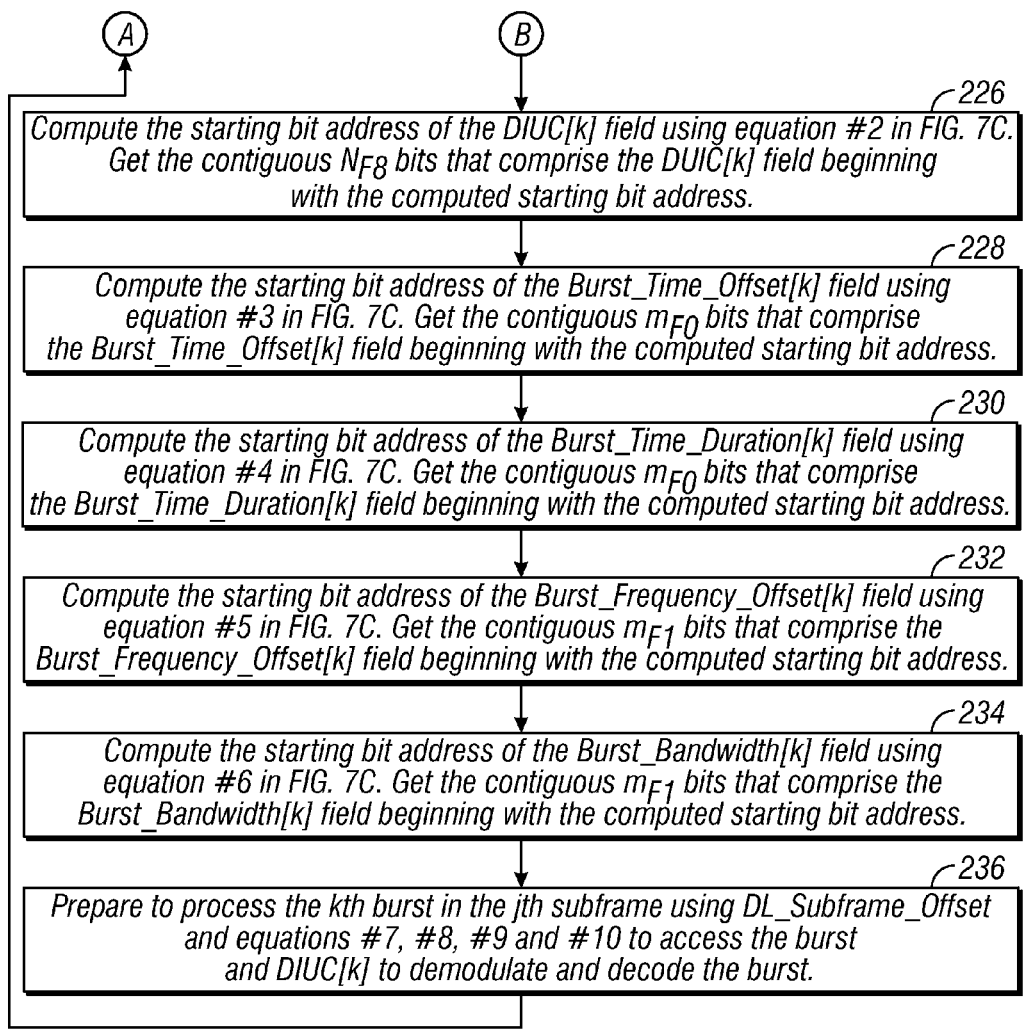

FIG. 7B shows an exemplary flowchart for disassembling downlink (DL) subframes at a receiver. The flowchart is divided into two processes. The first process (Steps 208 to 218) describes the method for disassembling SDL-MAP components. The second process (Steps 222 to 236) describes the method for disassembling information elements within the SDL-MAP. FIG. 7C shows a set of equations that are necessary for disassembling downlink (DL) subframes at a receiver.

In Step 200 the method for disassembling a DL subframe within a sequence of one or more DL superframes begins.

In Step 202 the binary representation of an integer $n_{SF} \geq 0$ is removed from the received length-$N_{F0}$ Number_Subframes field. $n_{SF}$ specifies the number of downlink subframes within the current received DL superframe, it may be specified by a scheduler. FIG. 5B shows the location of the Number_Subframes field within the SDL-MAP.

Step 204 counter variables j and k are initialized to zero. Counter variable j is used for counting subframes within the current superframe, counter variable k for counting the number of bursts within the current subframe. Counter j is needed to address subframes within a superframe, counter k to address bursts within subframes.

In Step 206 the current value of the subframe counter j is compared to $n_{SF}$ to see which processing steps to execute next. If the subframe counter j is less than number of downlink subframes $n_{SF}$, the method enters the process (Steps 208 to 218) for disassembling header fields within the current SDL-MAP. If the subframe counter j is greater than or equal to $n_{SF}$, the method returns to Step 200 in order to restart the disassembly method for the next superframe.

In Step 208 the process for disassembling received header fields within the SDL-MAP begins by obtaining the offset of the j th downlink subframe within the current superframe. In the preferred embodiment the offset is in units of OFDMA symbols with the superframe preamble being the reference point for the offset computation. The binary representation of the received length-$N_{F1}$ value is removed from the DL_Subframe_Offset field of the SDL-MAP header. FIG. 5B shows the location of the DL_Subframe_Offset field within the SDL-MAP.

In Step 210 the binary representation of the received length-$N_{F2}$ value $n_B$ is removed from the received Number_Subframe_Bursts field in the SDL-MAP header. $n_B$ denotes the number of data bursts that are allocated to the j th received DL subframe. This value is also used as a upper limit for the burst counter k. FIG. 5B shows the location of the Number_Subframe_Bursts field within the superframe header.

In Step 212 the binary representation of the brick dimension c is removed from the received length-$N_{F3}$ Brick_Time_Duration field. Brick dimension c denotes the time-duration of the j th subframe's bricks in units of OFDMA symbols. FIG. 5B shows the location of the Brick_Time_Duration field within the superframe header.

In Step 214 the binary representation of the brick dimension r is removed from the received length-$N_{F4}$ Brick_Bandwidth field. Brick dimension r denotes the bandwidth the j th subframe's bricks in units of OFDMA subcarriers. FIG. 5B shows the location of the Brick_Bandwidth field field within the superframe header.

In Step 216 the binary representation of the received value $m_{F0}$ is removed from the fixed length-$N_{F5}$ Number_Time_Field_Bits field. Variable $m_{F0}$ specifies the lengths of the subsequent fields Burst_Time_Offset[k] and Burst_Time_Duration[k], k=0,1, . . . , $n_B$–1. These fields are components of the burst Information Elements. Variable $m_{F0}$ must be read in order to determine the locations of Burst_Time_Offset[k] and Burst_Time_Duration[k] within a sequence of $n_B$ information elements that follow the SDL MAP header. Note that the lengths of the Burst_Time_Offset [k] and Burst_Time_Duration[k] fields may be time-varying with length dependent on the computed value $n_C$.

In Step 218 the binary representation of the received value $m_{F1}$ is removed from the length-$N_{F6}$ Number_Freq_Field_Bits field. Variable $m_{F1}$ specifies the lengths of the fields Burst_Frequency_Offset[k] and Burst_Bandwidth[k], k=0,1, . . . , $n_B$–1. These fields are components of the burst Information Elements. Variable $m_{F1}$ is read in order to determine the locations of Burst_Frequency_Offset[k] and Burst_Bandwidth[k] within a sequence of $n_B$ information elements that follow the SDL MAP header. Note that the lengths of the Burst_Frequency_Offset[k] and Burst_Bandwidth[k] fields may be time-varying with length dependent on the computed value $n_R$.

In Step 220 the current value of the burst counter k is compared to $n_B$ to see which processing steps to execute next. If the burst counter k is less than number of downlink subframe bursts $n_B$, the method enters the process (Steps 222 to 236) for disassembling burst information element fields within the current SDL-MAP. If the burst counter k is greater than or equal to $n_B$ all bursts or information elements allocated for the j th subframe have been processed so the method goes to Step 240 where the burst counter k is reset to zero. The method then goes to Step 242 where the subframe counter j is incremented by one. After Step 242 the method returns to Step 206.

In Step 222 the starting address Address_CID[k] of the current CID[k] field is first computed using equation 25:

$$\text{Address\_CID}[k] = \sum_{i=0}^{6} N_{Fi} + k\left(2\sum_{i=0}^{1} m_{Fi} + \sum_{i=7}^{8} N_{Fi}\right) + 1 \quad (25)$$

Equation 25 is also shown in FIG. 7C. $m_{F_0}$ and $m_{F_1}$ were obtained in Steps 216 and 218. Values $N_{F_i}$, i=0,1, ..., 8, are fixed and known by both the transmitter and receiver. Given the computed starting address Address_CID[k] the OFDMA connection bits for the current k th burst are removed from the received fixed length-$N_{F7}$ CID[k] field. FIG. 5B shows the locations of the CID[k], k=0,1, ..., $n_B$–1, fields within the $n_B$ burst information elements of the DL-MAP.

In Step 224 the current value of the CID[k] field is compared to the OFDMA user's signature or identification bits that are denoted as USER_ID. If CID[k] equals USER_ID, the received burst is for addressed for the user and the method enters the process for disassembling burst information element fields within the current SDL-MAP. If CID[k] does not equal USER_ID, the received burst is addressed for another OFDMA user so the method goes to Step 238 where the burst counter k is incremented by one. The method then goes to Step 220 in order to process the next DL subframe burst within the j th received superframe.

In Step 226 the starting address Address_DIUC[k] of the current DIUC[k] field is first computed using equation 26:

$$\text{Address\_DIUC}[k] = \text{Address\_CID}[k] + N_{F_7} \quad (26)$$

Equation 26 is also shown in FIG. 7C. Address_CID[k] was obtained in Step 222. Value $N_{F_7}$ is fixed and known by both the transmitter and receiver. Given the computed starting address Address_DIUC[k] the modulation and FEC coding descriptor bits are removed from the Downlink Interval Usage Code (DIUC) field within the received k th burst information element. Each DIUC[k] field is a fixed-length field ($N_{F_8}$ bits) that contains the code or reserved word identifying the FEC coding and modulation that is used for the k th burst. FIG. 5B shows the locations of the fields DIUC[k], k=0,1, ..., $n_B$–1, within the $n_B$ burst information elements of the DL-MAP.

In Step 228 the starting address Address_Burst_Time_Offset[k] of the current Burst_Time_Offset[k] field is first computed using equation 27:

$$\text{Address\_Burst\_Time\_Offset}[k] = \text{Address\_DIUC}[k] + N_{F_8} \quad (27)$$

Equation 27 is also shown in FIG. 7C. Address_DIUC[k] was obtained in Step 226. Value $N_{F_8}$ is fixed and known by both the transmitter and receiver. Given the computed starting address Address_Burst_Time_Offset[k], the binary representation of the time offset of the k th burst is removed from the Burst_Time_Offset[k] field of the of the received DL-MAP. The Burst_Time_Offset[k] field has a length of $m_{F_0}$ bits, the value within the Burst_Time_Offset[k] field is in units of r-by-c bricks. The length $m_{F_0}$ was received in Step 216, brick dimensions c and r were received in Steps 212 and 214.

In Step 230 the starting address Address_Burst_Time_Duration[k] of the current Burst_Time_Duration[k] field is first computed using equation 28:

$$\text{Address\_Burst\_Time\_Duration}[k] = \text{Address\_Burst\_Time\_Offset}[k] + m_{F_0} \quad (28)$$

Equation 28 is also shown in FIG. 7C. Address_Burst_Time_Offset[k] was obtained in Step 228. Value $m_{F_0}$ was obtained in Step 216. Given the computed starting address, the binary representation of the time duration of the k th burst is removed from the Burst_Time_Duration[k] field of the of the received DL-MAP. The Burst_Time_Duration[k] field has a variable length of $m_{F_0}$ bits, the value within the Burst_Time_Duration[k] field is in units of r-by-c bricks. The integer $m_{F_0}$ was received in Step 216, brick dimensions r and c were received in Steps 212 and 214.

In Step 232 the starting address Address_Burst_Frequecy_Offset[k] of the current Burst_Frequency_Offset[k] field is first computed using equation 29:

$$\text{Address\_Burst\_Frequecy\_Offset}[k] = \text{Address\_Burst\_Time\_Duration}[k] + m_{F_0} \quad (29)$$

Equation 29 is also shown in FIG. 7C. Address_Burst_Time_Duration[k] was obtained in Step 230. Value $m_{F_0}$ was obtained in Step 216. Given the computed starting address Address_Burst_Frequecy_Offset[k], the binary representation of the frequency offset of the k th burst is removed from the Burst_Frequency_Offset[k] field of the of the received DL-MAP. The Burst_Frequency_Offset[k] field has a variable length of $m_{F_1}$ bits, the value within the field is in units of r-by-c bricks. The integer $m_{F_1}$ was received in Step 218, brick dimensions r and c were received in Steps 212 and 214.

In Step 234 the starting address Address_Burst_Frequecy_Offset[k] of the current The Burst_Frequency_Offset[k] field is first computed using equation 30:

$$\text{Address\_Burst\_Bandwidth}[k] = \text{Address\_Burst\_Frequecy\_Offset}[k] + m_{F_1} \quad (30)$$

Equation 30 is also shown in FIG. 7C. Address Burst_Frequecy_Offset[k] was obtained in Step 232. Value $m_{F_1}$ was obtained in Step 218. Given the computed starting address Address_Burst_Bandwidth[k], the binary representation of the burst bandwidth of the k th burst is removed from the Burst_Bandwidth[k] field of the of the received DL-MAP. The Burst_Bandwidth[k] field has a variable length of $m_{F_1}$ bits, the value within the Burst_Bandwidth[k] field is in units of r-by-c bricks. The integer $m_{F_1}$ was received in Step 218, brick dimensions r and c were received in Steps 212 and 214.

In Step 236 the receiver prepares to process the k th received burst within the current subframe. The location of the burst is computed using equations 31 through 34:

$$\text{OFDMA\_Symbol\_Offset}[k] = \text{Burst\_Time\_Offset}[k] * c \quad (31)$$

$$\text{Number\_of\_Symbols}[k] = \text{Burst\_Time\_Duration}[k] * c \quad (32)$$

$$\text{OFDMA\_Subchannel\_Offset}[k] = \text{Burst\_Frequency\_Offset}[k] * r \quad (33)$$

$$\text{Number\_of\_Subchannels}[k] = \text{Burst\_Bandwidth}[k] * r \quad (34)$$

The modulation and coding used for the k th received burst were received in Step 226. The field values required were all received in previous steps.

In Step 238 the burst counter k is incremented by one. After Step 238 the method returns to Step 220 in order to restart the process for the next DL burst information element.

Cellular network communications are generally comprised of one or more frames transmitted between a base station and a network user. Frames are packets of data that are transmitted as a single unit; they are the fundamental transport structure used for all downlink and uplink radio transmissions between a base stations and a network user.

Frames are typically comprised of a frame payload segment and a frame header segment. The payload segment contains the desired data (e.g. file, voice, video, etc.) to be communicated. The frame header segment contains frame overhead bits that are prefixed to the payload segment in order to provide frame structure and processing information. Frame structure and processing information may include frame type, burst sizes and locations within a frame, used signal coding and modulation, network addresses, network routing, link reliability data, and signal processing operations.

The ratio of the maximum payload segment size to the size of the frame overhead segment determines the maximum efficiency of a network link. For example, if 10% of a frame comprises the frame header segment on a 10 Mbps network connection, the maximum efficiency of the network connection is 9 Mbps of data throughput. Depending on the particular frame overhead segment, the ratio may be significantly higher, thereby further reducing the data throughout and potentially increasing the number of frames necessary to transmit a complete communication. This may result in prolonged network usage for network users and extended processor or power utilization.

Embodiments of the invention disclose methods for reducing the number of frame overhead bits within OFDMA frame and superframe structures. The methods are based on a logical frame element called a brick. A brick is a variable area of contiguous OFDMA symbols and subcarriers (or physical subchannels) within a subframe that is treated as a single logical unit. A brick covers a rectangular or square area within a subframe's time-frequency plane, and it may be varied in its dimensions to adapt to dynamic burst sizes and locations. Burst sizes and locations within a subframe are dependent on time-varying channel, interference and network conditions.

While various embodiments of the invention have been described above, it should be understood that they have been presented by way of example only, and not of limitation. Likewise, the various diagrams may depict an example architectural or other configuration for the present invention, which is done to aid in understanding the features and functionality that can be included in the present invention. The present invention is not restricted to the illustrated example architectures or configurations, but can be implemented using a variety of alternative architectures and configurations. Additionally, although the present invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments, whether or not such embodiments are described and whether or not such features are presented as being a part of a described embodiment. Thus the breadth and scope of the present invention should not be limited by any of the above-described exemplary embodiments.

What is claimed is:

1. A method of tessellating a subframe using maximal-sized bricks, each brick comprising a brick bandwidth (r) in units of subcarriers or physical subchannels, and a brick time duration (c) in units of symbols, the subframe comprising a plurality of ($n_B$) bursts having burst heights ($\beta_{H,k}$, k=0, ..., $n_B-1$) in units of subcarriers or physical subchannels and burst widths ($\beta_{W,k}$, k=0, ..., $n_B-1$) in units of symbols, the method comprising:

computing, using a processor, r and c using equations $r = GCD(\beta_{H,0}, \beta_{H,1}, \ldots \beta_{H,nB-1})$ and $c = GCD(\beta_{W,0}, \beta_{W,1}, \ldots, \beta_{W,nB-1})$, wherein $n_B$, is an integer value, k is an integer value, $\beta_{H,k}$ denotes a set of k burst heights, $\beta_{W,k}$, denotes a set of k burst widths, GCD denotes the greatest common divisor, and neither r nor c is equal to one; and referencing bursts within the subframe using a brick-based coordinate system in which burst location and size are specified in units of bricks.

2. The method of claim 1, further comprising computing GCD values using a Euclidean algorithm.

3. The method of claim 1, further comprising computing GCD values using an Extended Euclidean algorithm.

4. The method of claim 1, further comprising computing GCD values using a binary GCD algorithm.

5. The method of claim 1, wherein r and c are computed once per subframe.

6. The method of claim 1, wherein a kth burst within the subframe is represented by a symbol offset (OFDMA_Symbol_Offset[k]), a number of symbols (Number_of_Symbols [k]), a subchannel offset (OFDMA_Subchannel_Offset[k]), and a number of subchannels (Number_of_Subchannels [k]).

7. The method of claim 6, further comprising referencing the kth burst within the subframe by a burst time offset (Burst_Time_Offset[k]), a burst time duration (Burst_Time_Durationt[k]), a burst frequency offset (Burst_Frequency_Offset[k]), and a burst bandwidth (Burst_Bandwidth [k]), wherein $$Burst\_Time\_Offset[k] = \frac{(OFDMA\_Symbol\_Offset[k])}{c},$$

$$Burst\_Time\_Durationt[k] = \frac{(Number\_of\_Symbols[k])}{c},$$

$$Burst\_Frequency\_Offset[k] = \frac{(OFDMA\_Subchannel\_Offset[k])}{r}, \text{ and}$$

$$Burst\_Bandwidth[k] = \frac{(Number\_of\_Subchannels[k])}{r}.$$

8. The method of claim 1, further comprising computing a number $n_R$, of r-by-c bricks that cover the subframe's bandwidth in a time-frequency plane using an equation wherein $$n_R = \frac{N_{FFT}}{r},$$

where $N_{FFT}$, denotes the number of subcarriers or subchannels.

9. The method of claim 8, further comprising computing an integer $m_{F1}$, using an operation where $m_{F1}=\text{ceil}(\log_2(n_R))$, wherein $\text{ceil}(\log_2(n_R))$ rounds $\log_2(n_R)$ to a nearest integer towards infinity.

10. The method of claim 9, further comprising setting lengths of Burst_Frequency_Offset[k] and Burst_Bandwidth [k] as $m_{F1}$.

11. The method of claim 1, further comprising computing a number $n_c$, of r-by-c bricks that cover the subframe's time duration in a time-frequency plane using an equation wherein $$n_C = \frac{N_{Symbls}}{c},$$

wherein $N_{Symbls}$, denotes the number of symbols within the subframe.

12. The method of claim 11, further comprising computing an integer $m_{F0}$, using an operation wherein $m_{F0}$=ceil(log$_2$(n$_c$)), wherein ceil(log$_2$(n$_c$)) rounds log$_2$(n$_c$) to a nearest integer towards infinity.

13. The method of claim 12, further comprising setting lengths of Burst_Time_Offset[k] and Burst_Time_Duration [k] as $m_{F0}$.

14. A method for assembling a brick-based superframe, the superframe comprising a Superframe Preamble, a Superframe Control Header (SCH), a Superframe Downlink Map (SDL-MAP), and a Superframe Uplink MAP (SUL-MAP), the SDL-MAP comprising a plurality of (n$_{SF}$) Downlink Maps (DL-MAPs) for configuring a plurality of (n$_{SF}$) subframes, each DL-MAP comprising a plurality of (n$_B$) Information Elements (IEs) for configuring a plurality of (n$_B$) bursts, the method comprising:
  inserting a plurality of (n$_B$) bursts having burst heights (β$_{H,k}$, k=0, . . . , n$_B$−1) in units of subcarriers or physical subchannels and burst widths (β$_{W,k}$, k=0, . . . , n$_B$−1) in units of symbols into a subframe;
  computing, using a processor, a brick bandwidth (r) and a brick time duration (c) using equations r=GCD(β$_{H,0}$, β$_{H,1}$, . . . , β$_{H,nB-1}$) and c=GCD((β$_{W,0}$, β$_{W,1}$, . . . , β$_{W,nB-1}$), where n$_B$, is an integer value, k is an integer value, βH,k denotes a set of k burst heights, β$_{W,k}$ denotes a set of k burst widths, GCD denotes the greatest common divisor, and neither r nor c is equal to one;
  inserting r and c into a DL-MAP;
  computing, using a processor, a burst time offset (Burst_Time_Offset[k]), a burst time duration (Burst_Time_Durationt[k]), a burst frequency offset (Burst_Frequency_Offset[k]) and a burst bandwidth (Burst_Bandwidth[k]) for a kth burst within the subframe;
  inserting Burst_Time_Offset[k], Burst_Time_Duration [k], Burst_Frequency_Offset[k], and Burst_Bandwidth [k] into an Information Element (IE) within the DL-MAP.

15. The method of claim 14, wherein a kth burst within the subframe is represented by a symbol offset (OFDMA_Symbol_Offset[k]), a number of symbols (Number_of Symbols [k]), a subchannel offset (OFDMA_Subchannel_Offset[k]), and a number of subchannels (Number_of Subchannels [k]).

16. The method of claim 15, wherein $$\text{Burst\_Time\_Offset}[k] = \frac{(\text{OFDMA\_Symbol\_Offset}[k])}{c},$$

$$\text{Burst\_Time\_Durationt}[k] = \frac{(\text{Number\_of\_Symbols}[k])}{c},$$

$$\text{Burst\_Frequency\_Offset}[k] = \frac{(\text{OFDMA\_Subchannel\_Offset}[k])}{r}, \text{ and}$$

$$\text{Burst\_Bandwidth}[k] = \frac{(\text{Number\_of\_Subchannels}[k])}{r}.$$

17. The method of claim 14, further comprising computing a number n$_R$, of r-by-c bricks that cover the subframe's bandwidth in a time-frequency plane using an equation wherein $$n_R = \frac{N_{FFT}}{r},$$

where N$_{FFT}$ denotes the number of subcarriers or subchannels.

18. The method of claim 17, further comprising computing an integer $m_{F1}$ using an operation wherein $m_{F1}$=ceil(log$_2$(n$_R$)), wherein ceil(log$_2$(n$_R$)) rounds log$_2$(n$_R$) to a nearest integer towards infinity.

19. The method of claim 18, further comprising setting lengths of Burst_Frequency_Offset[k] and Burst_Bandwidth [k] as $m_{F1}$.

20. The method of claim 14, further comprising computing a number n$_c$ of r-by-c bricks that cover the subframe's time duration in a time-frequency plane using an equation wherein $$n_C = \frac{N_{Symbls}}{c},$$

wherein N$_{Symbls}$, denotes the number of symbols within the subframe.

21. The method of claim 20, further comprising computing an integer $m_{F0}$, using an operation wherein $m_{F0}$=ceil(log$_2$(n$_c$)), wherein ceil(log$_2$(n$_c$)) rounds log$_2$(n$_c$) to a nearest integer towards infinity.

22. The method of claim 21, further comprising setting lengths of Burst_Time_Offset[k] and Burst_Time_Duration [k] as $m_{F0}$.

23. The method of claim 14, wherein the superframe comprises a plurality of frames, and each frame comprises one DL subframe and one UL subframe.

24. The method of claim 14, wherein the superframe comprises a downlink-uplink ratio of 1-to-1.

25. The method of claim 14, wherein the superframe comprises a downlink-uplink ratio that is not 1-to-1.

26. A method for disassembling a brick-based superframe, the superframe comprising a Superframe Preamble, a Superframe Control Header (SCH), a Superframe Downlink Map (SDL-MAP), and a Superframe Uplink MAP (SUL-MAP), the SDL-MAP comprising a plurality of (n$_{SF}$) Downlink Maps (DL-MAPs) for configuring a plurality of (n$_{SF}$) subframes, each DL-MAP comprising a plurality of (n$_B$) Information Elements (IEs) for configuring a plurality of (n$_B$) bursts, the method comprising:
  processing a DL MAP to obtain a brick bandwidth (r) and a brick time duration (c) of the bricks that tessellate a subframe;
  processing an IE within the DL MAP to obtain a burst time offset (Burst_Time_Offset[k]), a burst time duration (Burst_Time_Durationt[k]), a burst frequency offset (Burst_Frequency_Offset[k]) and a burst bandwidth (Burst_Bandwidth[k]) for a kth burst within the subframe;
  computing, using a processor, a symbol offset (OFDMA_Symbol_Offset[k]), a number of symbols (Number_of Symbols [k]), a subchannel offset (OFDMA_Subchannel_Offset[k]), and a number of subchannels (Number_of_Subchannels[k]) for the kth burst within the subframe using equations OFDMA_Symbol_Offset[k]=Burst_Time_Offset[k]*c, Number_of_Symbols [k]=Burst_Time_Duration[k]*c, OFDMA_Subchannel_Offset[k]=Burst_Frequency_Offset[k]*r, and Number_of_Subchannels[k]=Burst_Bandwidth[k]*r, wherein n$_{SF}$,n$_B$ and k are integer values.

27. The method of claim 26, wherein the superframe comprises a plurality of frames, and each frame comprises one DL subframe and one UL subframe.

28. The method of claim 26, wherein the superframe comprises a downlink-uplink ratio of 1-to-1.

29. The method of claim 26, wherein the superframe comprises a downlink-uplink ratio that is not 1-to-1.

* * * * *